United States Patent [19]
Foster

[11] Patent Number: 5,605,221
[45] Date of Patent: Feb. 25, 1997

[54] DRIVE UNIT WITH BEARING MOUNT

[76] Inventor: Raymond K. Foster, P.O. Box 1, Madras, Oreg. 97741

[21] Appl. No.: 571,564

[22] Filed: Dec. 13, 1995

Related U.S. Application Data

[63] Continuation-in-part of Ser. No. 390,759, Feb. 17, 1995, Pat. No. 5,482,155, which is a continuation-in-part of Ser. No. 304,404, Sep. 12, 1994, Pat. No. 5,415,271.

[51] Int. Cl.⁶ .................................................. B65G 25/00
[52] U.S. Cl. ........................................................ 198/750.5
[58] Field of Search ....................... 198/750.5; 414/525.1

[56] References Cited

U.S. PATENT DOCUMENTS

| | | |
|---|---|---|
| Re. 35,022 | 8/1995 | Foster . |
| 4,143,760 | 3/1979 | Hallstrom . |
| 4,474,285 | 10/1984 | Foster . |
| 4,748,893 | 6/1988 | Foster . |
| 4,785,929 | 11/1988 | Foster . |
| 4,896,761 | 1/1990 | Foster . |
| 5,165,524 | 11/1992 | Foster . |
| 5,193,661 | 3/1993 | Foster . |
| 5,255,712 | 10/1993 | Foster . |
| 5,263,573 | 11/1993 | Hallstrom . |
| 5,313,872 | 5/1994 | Foster . |
| 5,325,763 | 7/1994 | Foster . |
| 5,350,054 | 9/1994 | Foster . |
| 5,390,781 | 2/1995 | Foster . |
| 5,415,271 | 5/1995 | Foster . |
| 5,427,229 | 6/1995 | Foster . |
| 5,433,312 | 7/1995 | Foster . |

*Primary Examiner*—D. Glenn Dayoan
*Attorney, Agent, or Firm*—Delbert J. Barnard; Joan H. Pauly; Kathleen T. Petrich

[57] ABSTRACT

A drive unit for a reciprocating floor conveyor has a piston component (90) with an outer end longitudinally fixed to a transverse mounting member and a movable cylinder component (92) with a tubular extension (102). A slide bearing (104) supports and guides the tubular extension (102). The drive unit, including the tubular extension, acts as a structural beam. In a first embodiment, each floor member of the conveyor has its own drive unit to provide a powerful drive assembly for heavy loads. In a second embodiment, a plurality of drive units are part of a compact frame (302) having two longitudinal frame members (308) and two transverse mounting members (304, 306). The drive units are mounted in a window defined by the frame (302). A plurality of transverse drive beams (330), one for each drive unit, are connected to the drive units and reciprocate between the transverse mounting members (304, 306). This provides a compact and lightweight drive assembly that may be used for lighter loads.

32 Claims, 27 Drawing Sheets

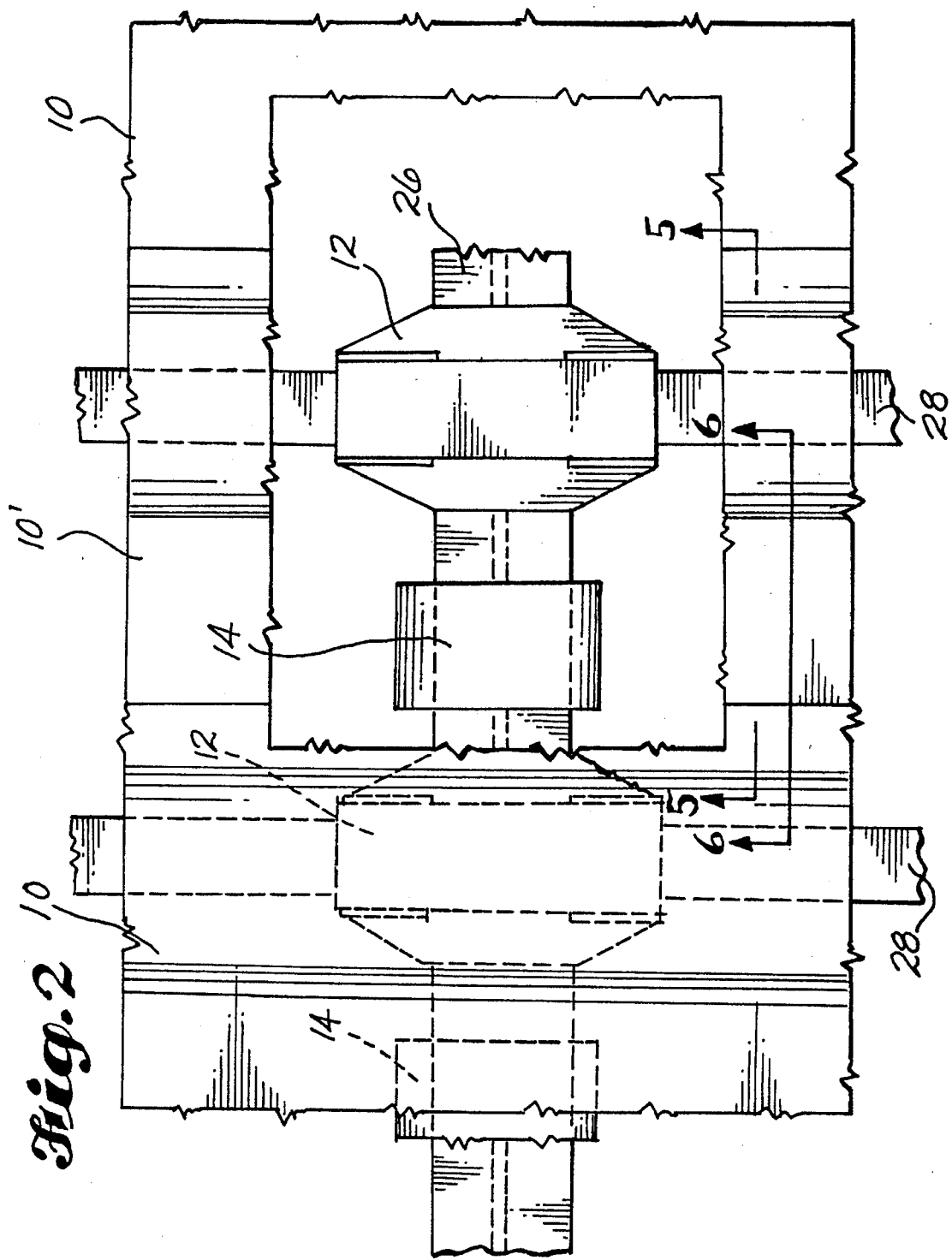

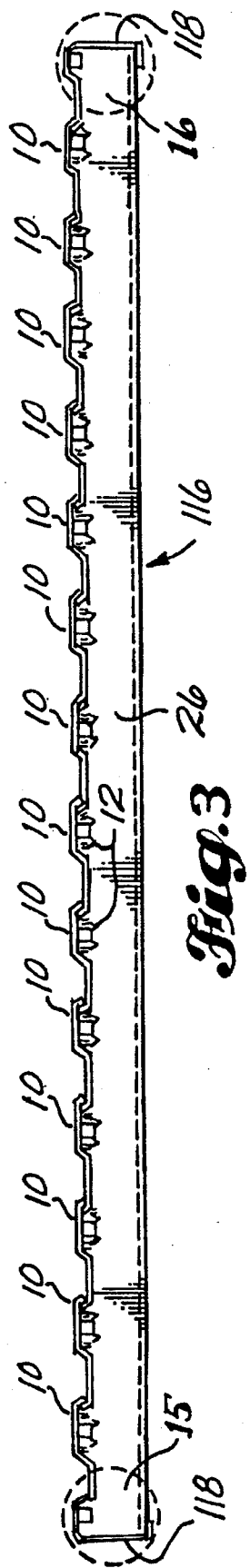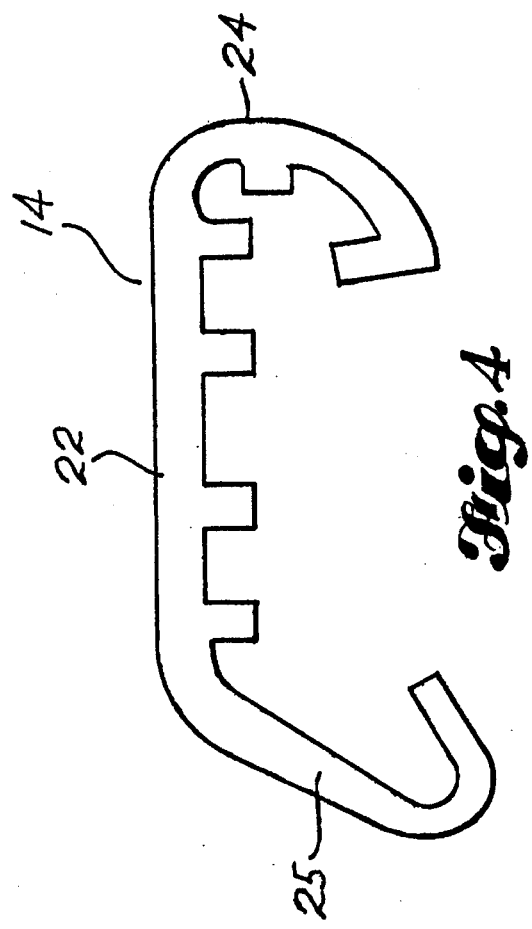

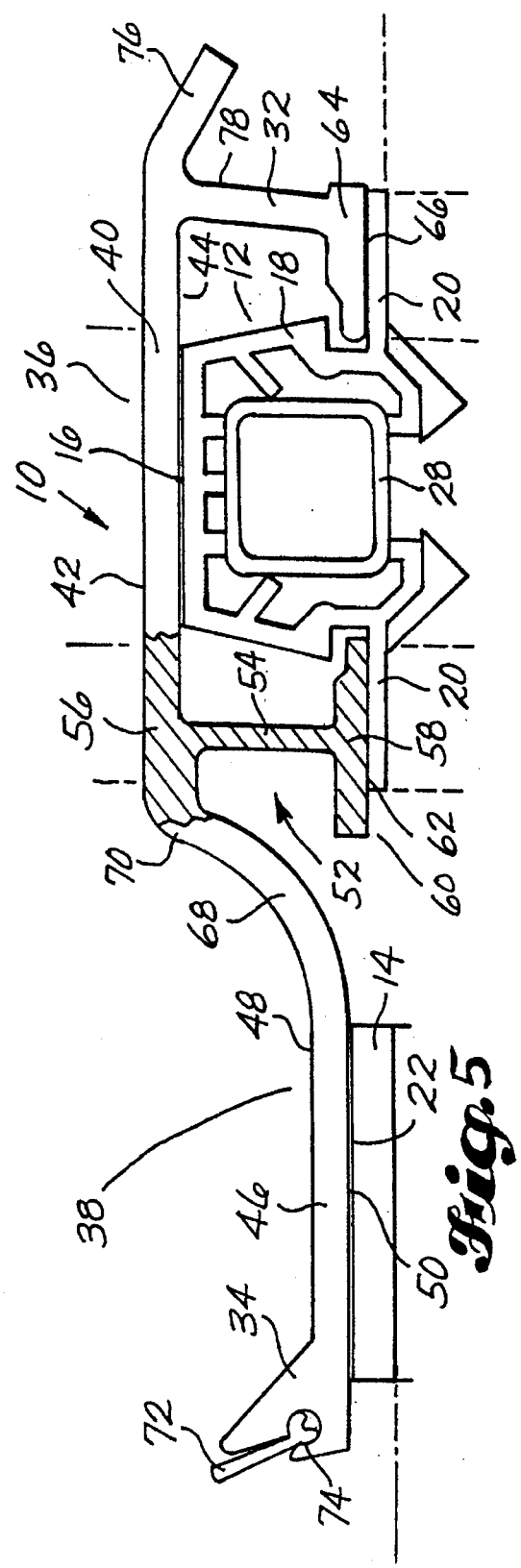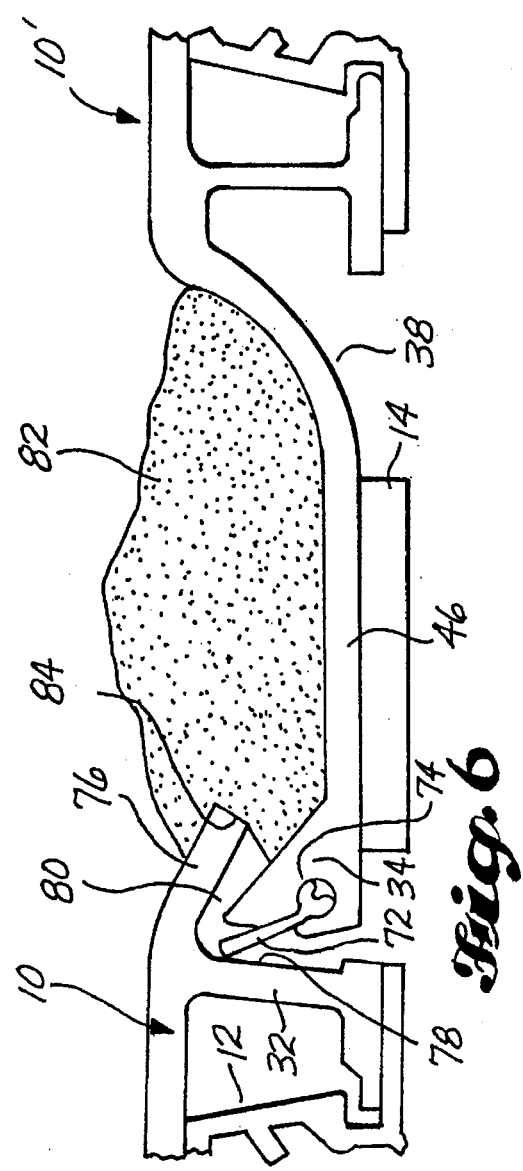

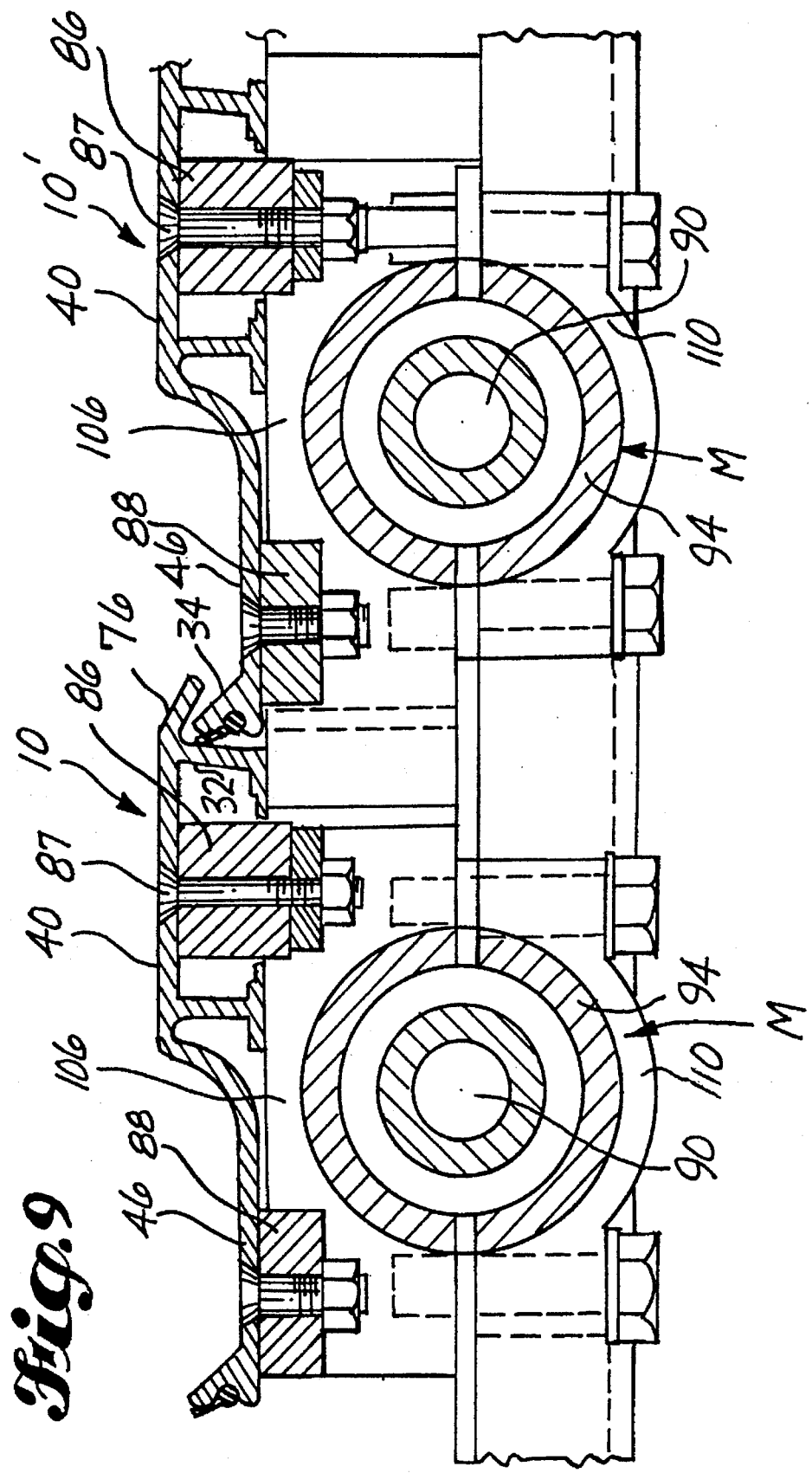

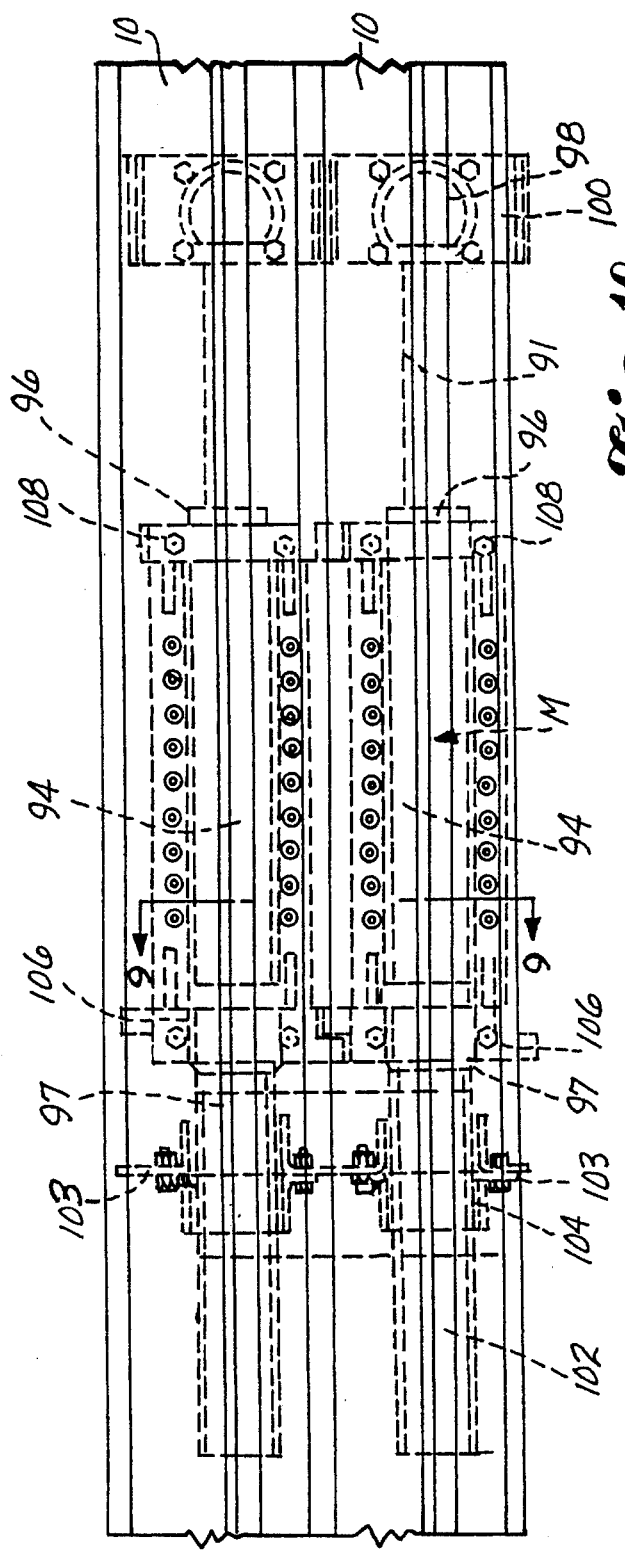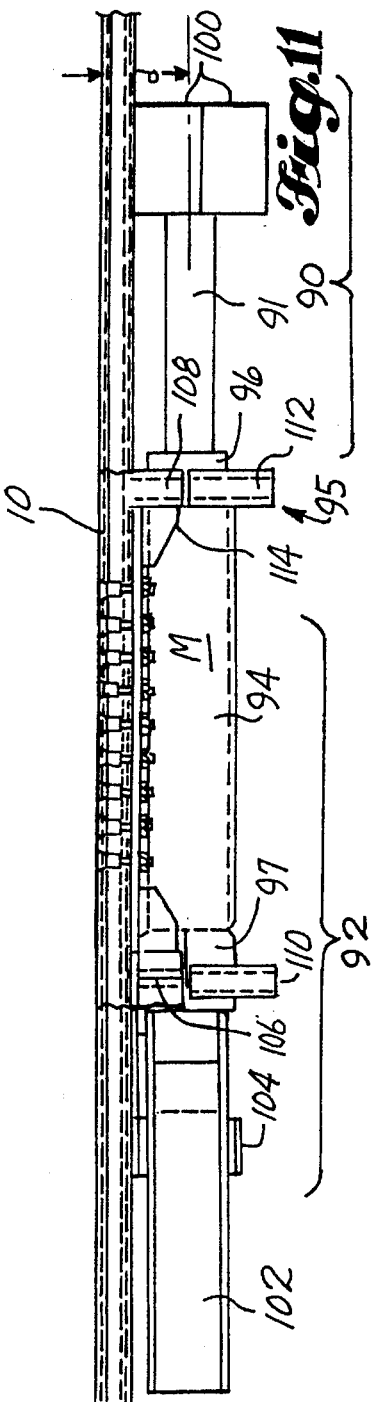

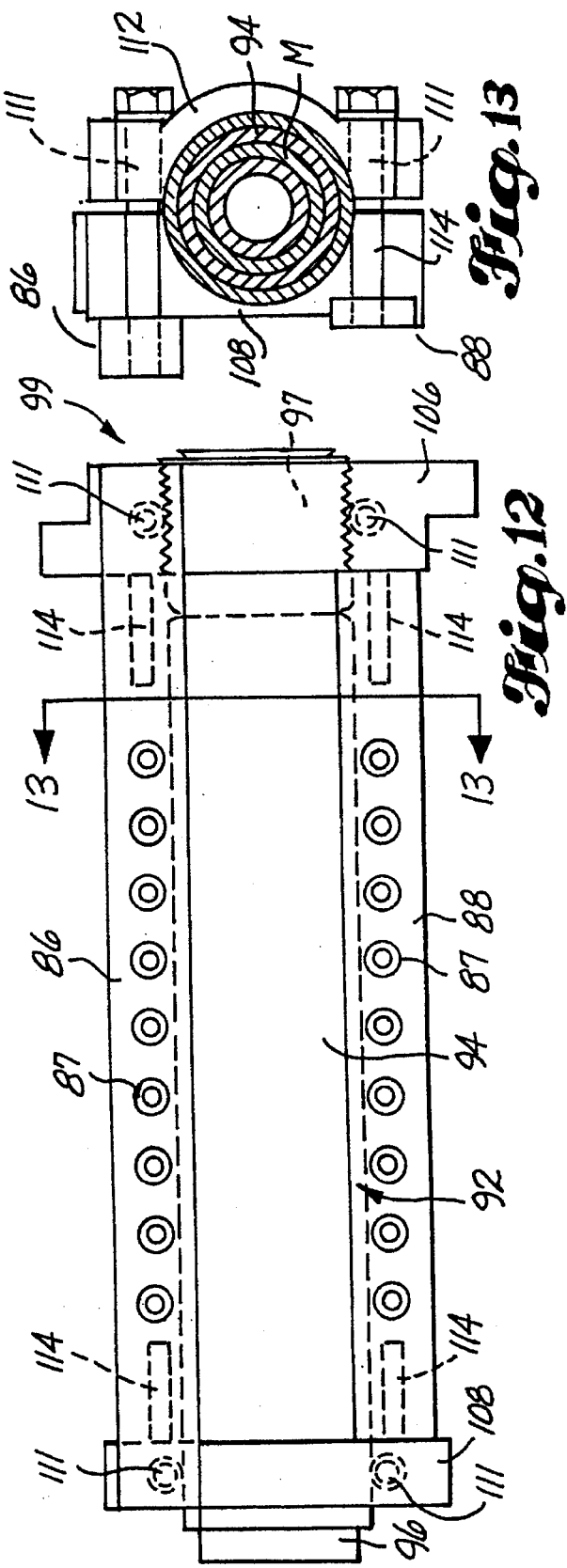
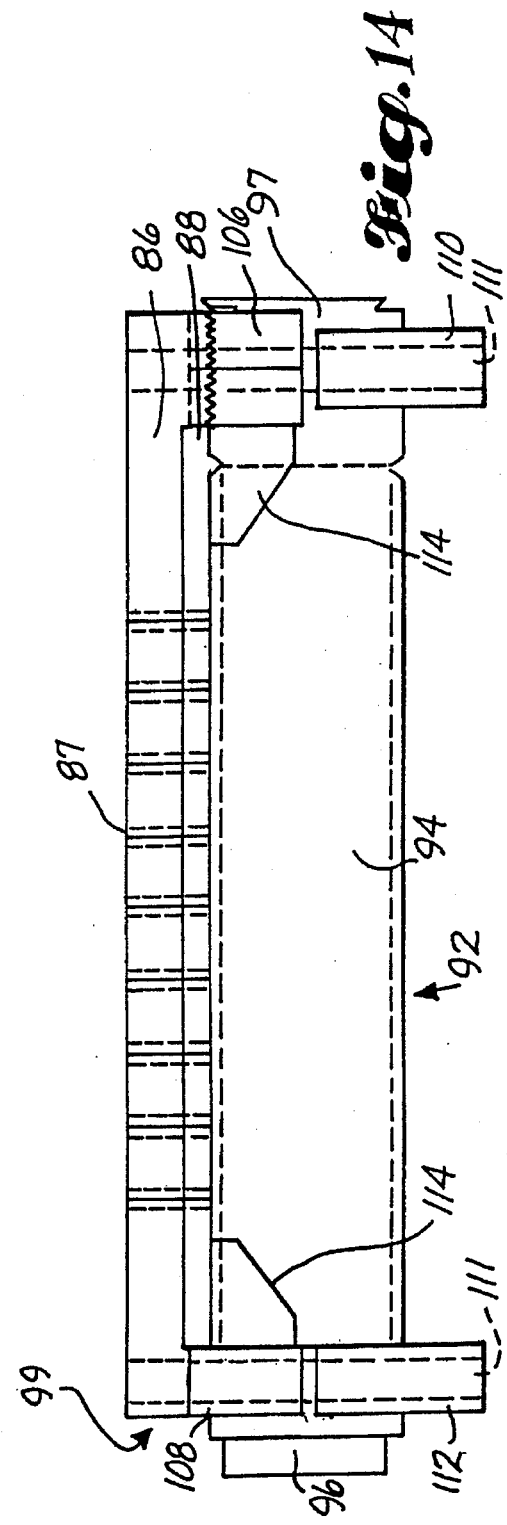

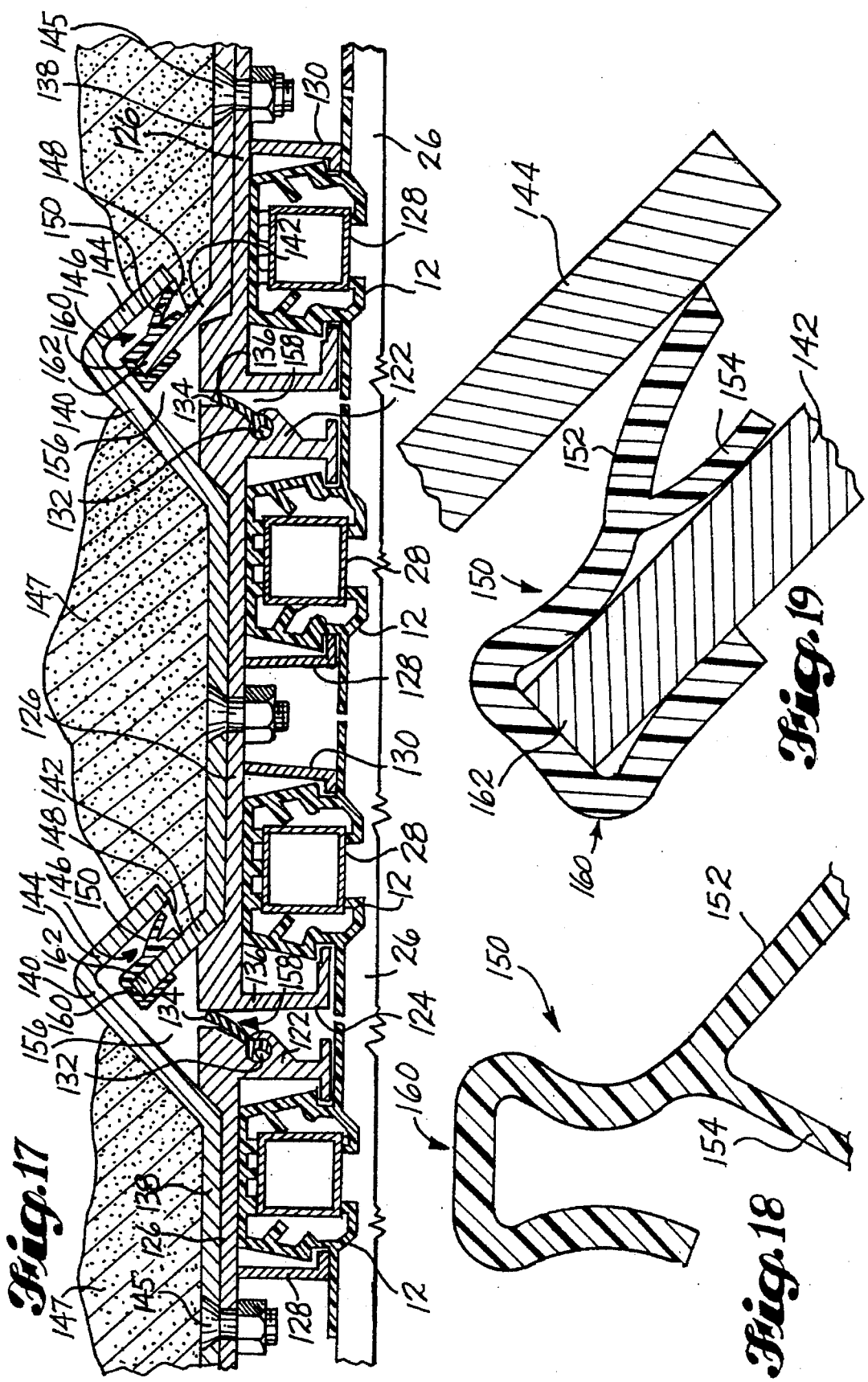

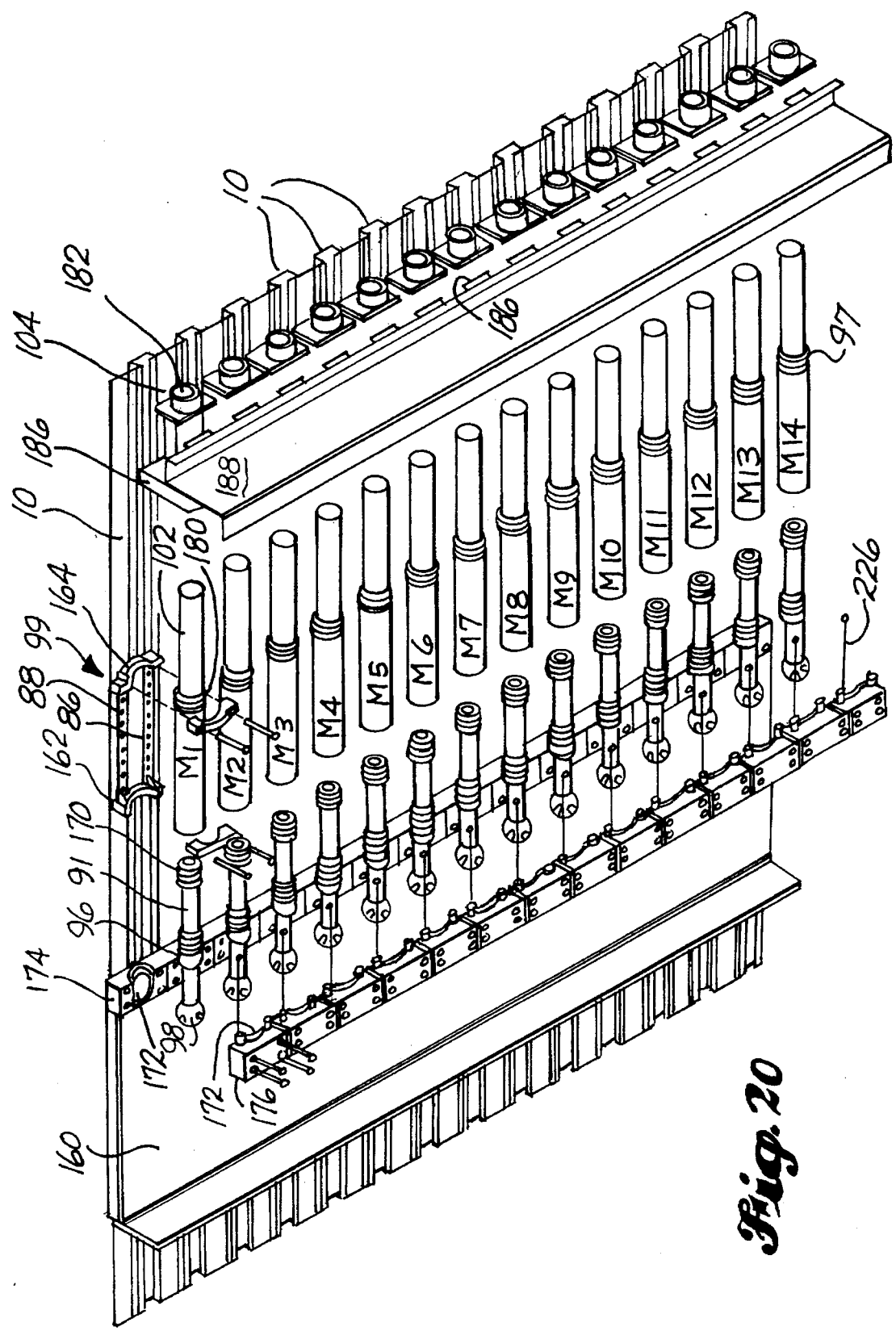

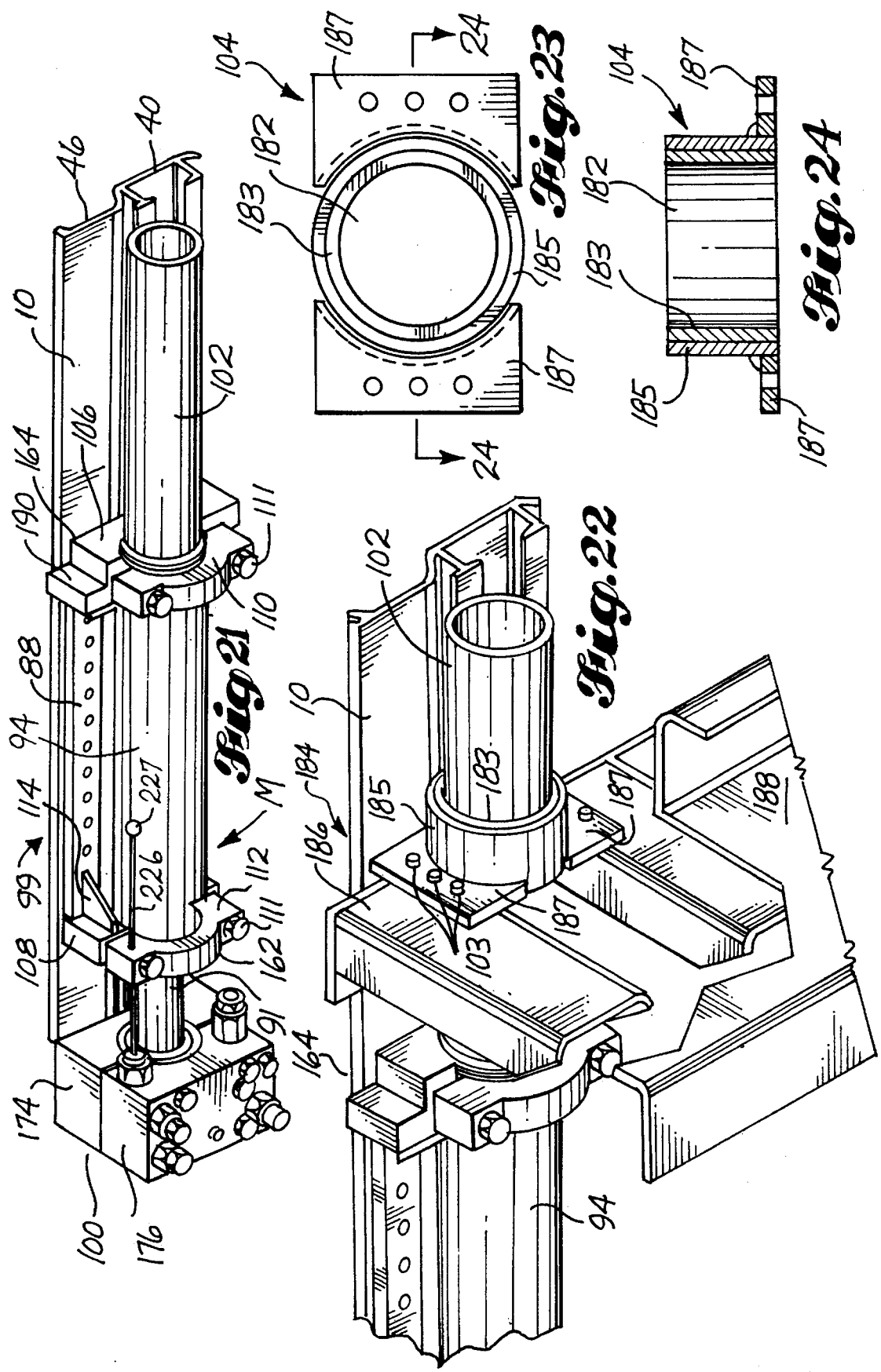

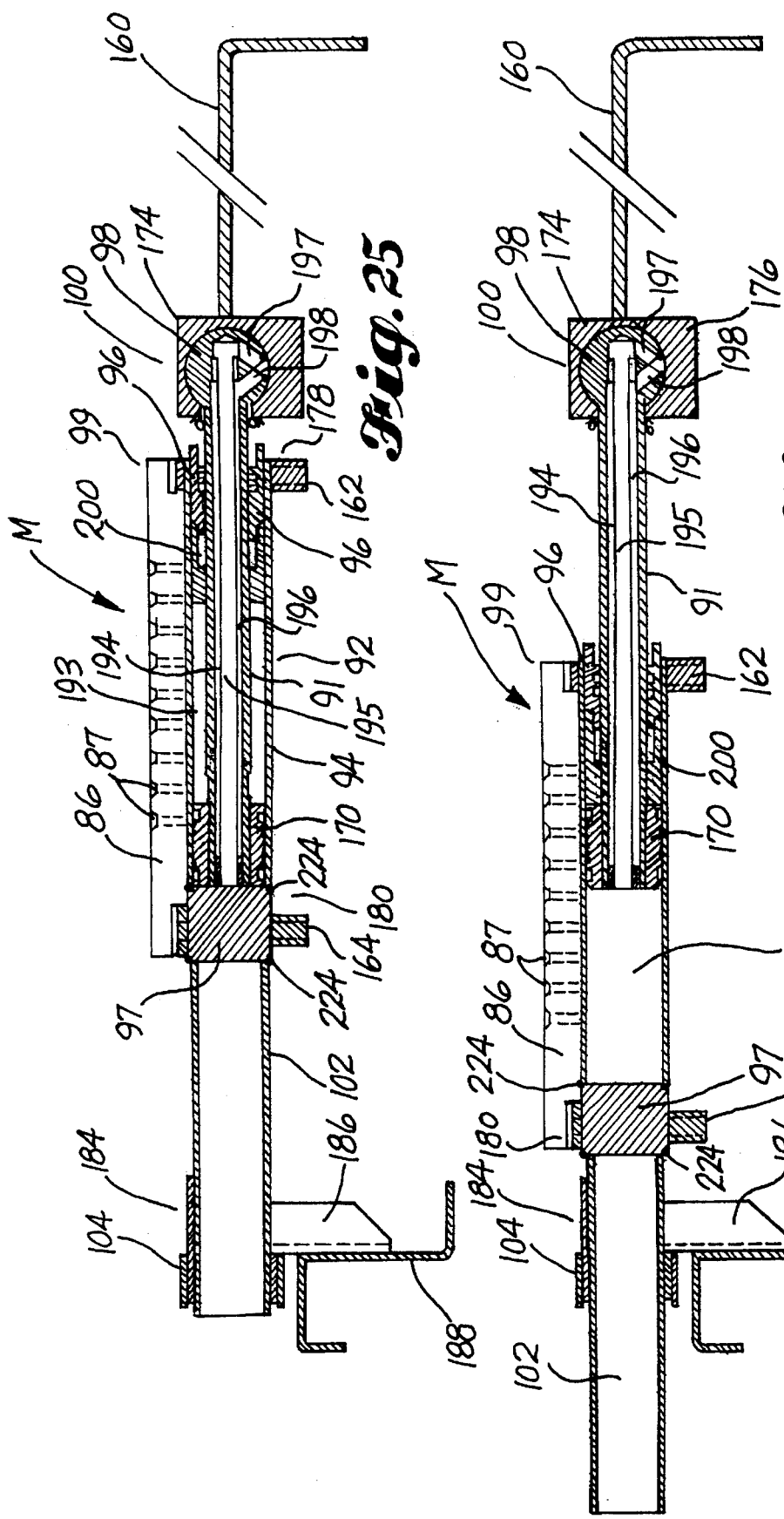

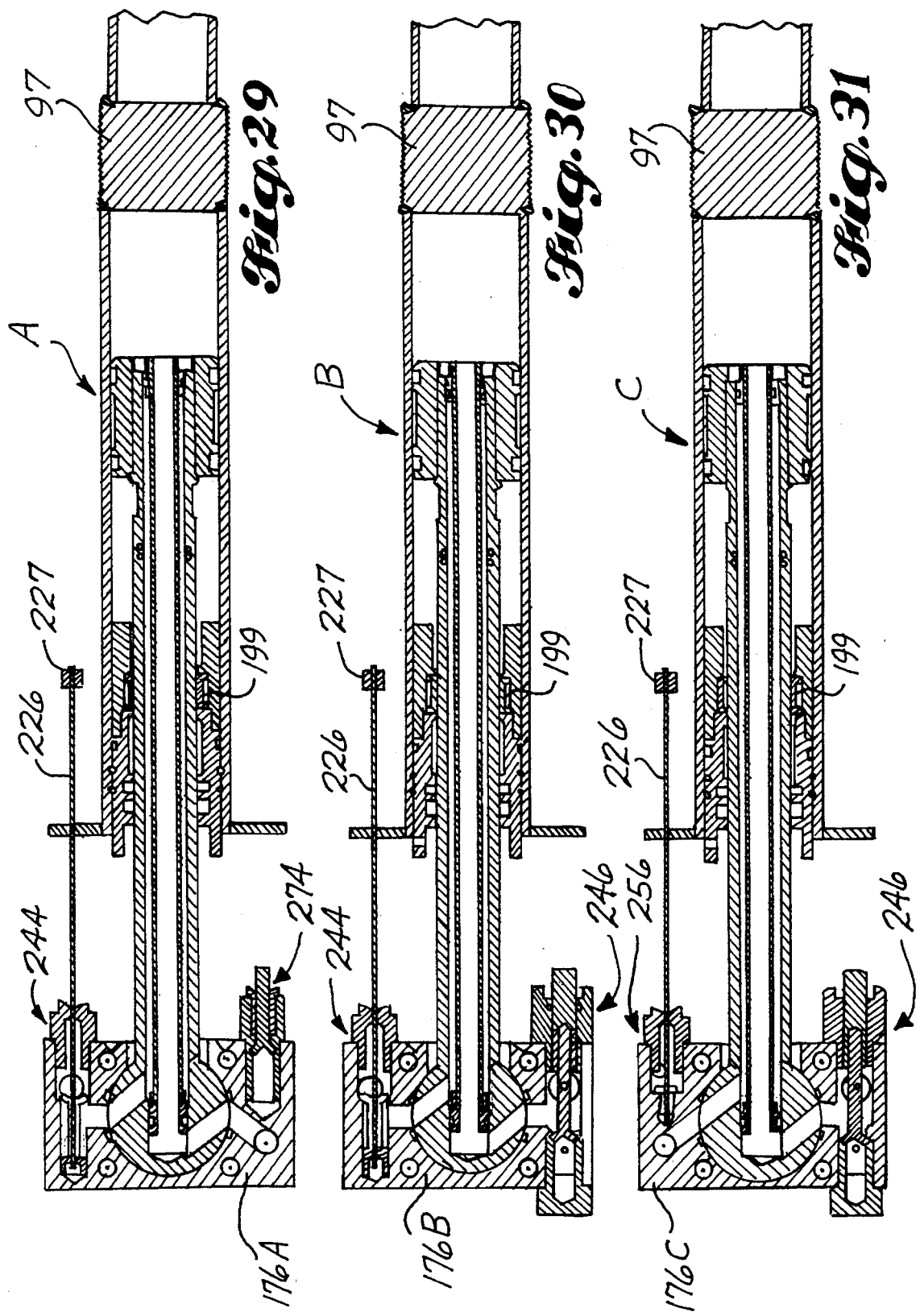

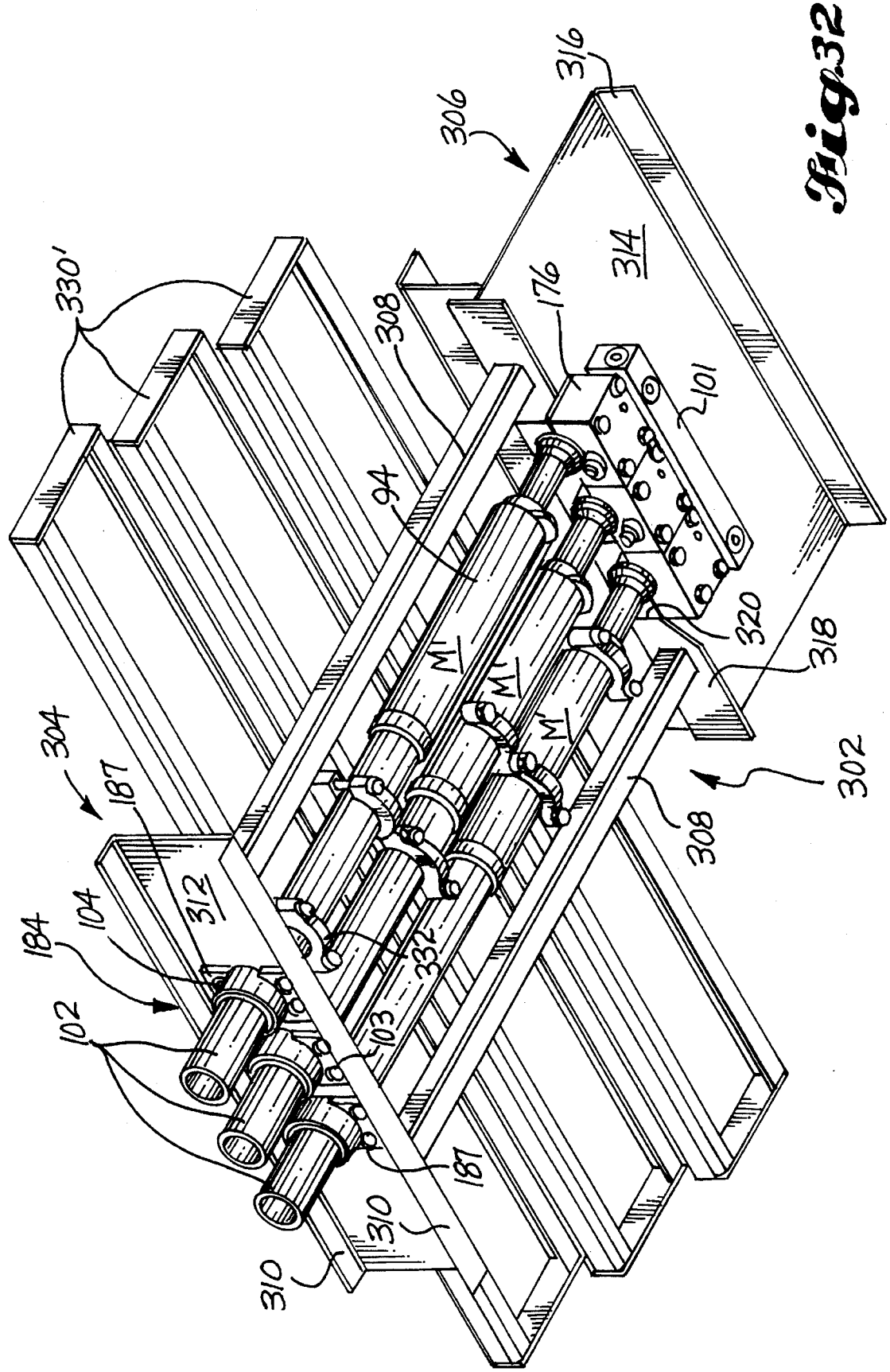

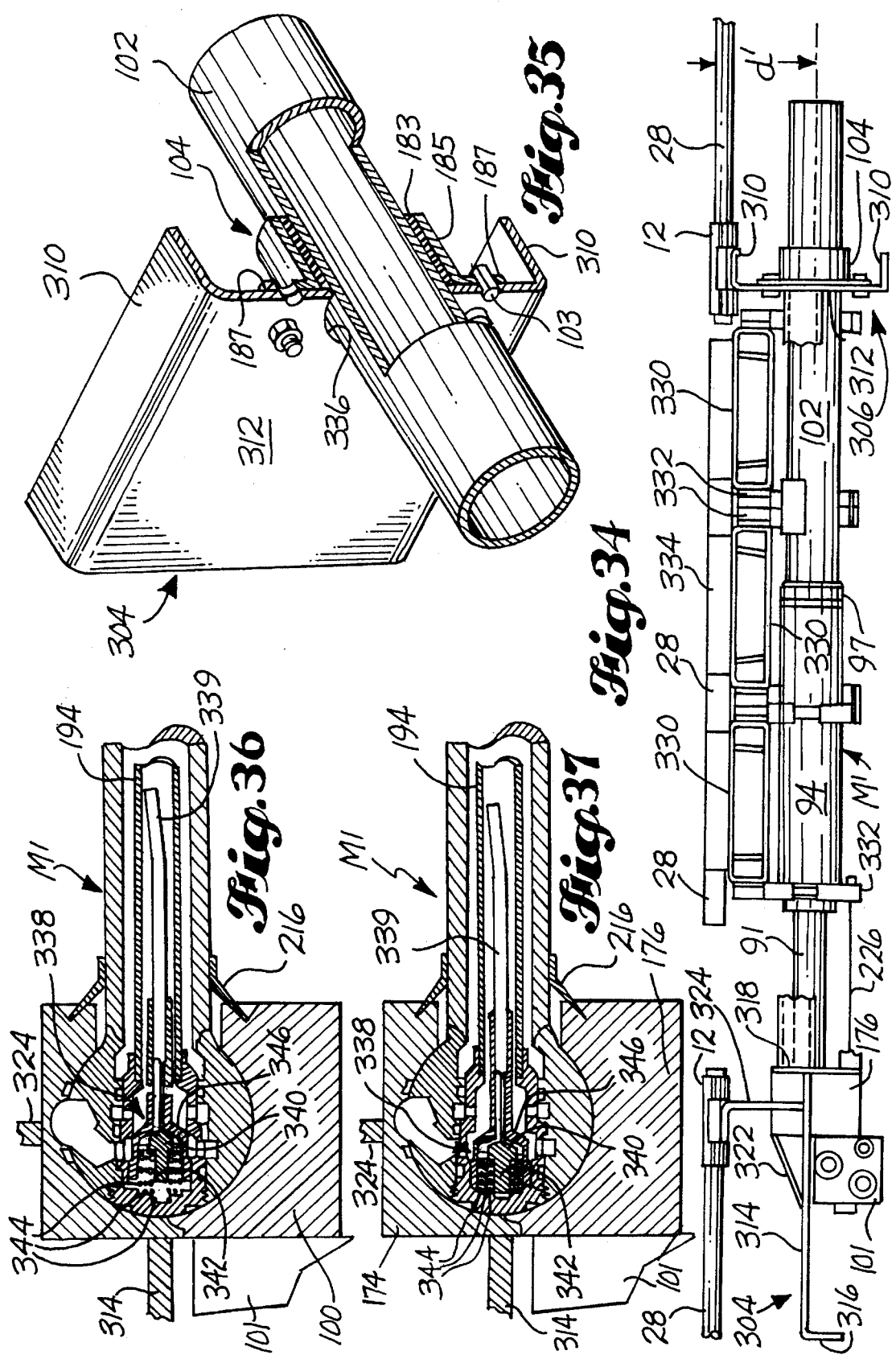

DRIVE UNIT WITH BEARING MOUNT

RELATED APPLICATION

This is a continuation-in-part of my co-pending U.S. application Ser. No. 08/390,759, filed Feb. 17, 1995, and entitled "Reciprocating Floor Conveyor and Floor Member," now U.S. Pat. No. 5,482,155 which, is a continuation-in-part application of U.S. Ser. No. 08/304,404, filed Sep. 12, 1994, and entitled, "Reciprocating Floor Conveyor with Overlay Protection Plate," now U.S. Pat. No. 5,415,271, granted May 16, 1995.

BACKGROUND INFORMATION

Reciprocating floor conveyors are used for a variety of purposes, including facilitating removal of garbage and other bulk material from containers that are transported to a landfill or other receiving site. My aforementioned copending application Ser. No. 08/390,759 discloses and claims a plurality of elongated floor slat members for a reciprocating floor conveyor suitable for use in garbage collection containers.

Reciprocating floor conveyors are commonly powered by drive assemblies that include linear hydraulic motors, such as that disclosed in my U.S. Pat. No. 5,325,763 granted Jul. 5, 1994, and entitled, "Internal Check Valve." My U.S. Pat. No. 5,165,524, granted Nov. 24, 1992, and entitled "Reciprocating Floor Conveyor" discloses a reciprocating floor conveyor designed for use in smaller trailers or trailers/containers with lighter loads.

A principal object of the present invention is to provide an improved drive unit and a unique bearing mount that provides extra stability and aids alignment during linear movement of the drive unit.

DISCLOSURE OF THE INVENTION

The present invention provides a drive unit with a bearing mount for a reciprocating floor conveyor having a plurality of elongated floor slat members mounted adjacent each other for longitudinal reciprocation. At least one elongated floor slat member is driven by the drive unit. The drive unit includes a longitudinally fixed piston component, a cylinder component, an axially-extending tubular extension, and a fixed tubular slide bearing.

The piston component has an outer end portion mounted on a fixed support and an inner end portion. The inner end portion includes a piston head. The piston component also includes a piston rod that extends outwardly from the piston head.

The cylinder component includes a cylinder barrel mounted to travel on the piston head. The cylinder barrel has a first end through which the piston rod extends and a second closed end.

The tubular extension is attached to the second closed end to travel with the cylinder barrel. The slide bearing has an axial opening through which the tubular extension extends. The bearing supports and guides the tubular extension to aid alignment of the cylinder barrel.

In preferred form, the outer end portion of the piston component includes a ball end. The drive unit has a corresponding fixed ball block that defines a socket into which the ball end is received. The ball block is secured to the fixed support to mount the outer end portion thereon.

Also in preferred form, the second end of the cylinder barrel includes a cylinder plug. The plug is attached to the tubular extension.

According to one aspect of this invention, the cylinder component is connected to at least one floor slat member via a barrel clamp.

According to another aspect of the invention, a plurality of the linear hydraulic drive units described above are included in the conveyor and are used to selectively reciprocate a plurality of elongated floor slat members. The cylinder component of each of the drive units is connected to at least one floor slat member. In some installations, each floor slat member may be provided with its own drive unit and is preferably connected thereto by a barrel clamp. In other situations, it is advantageous to arrange the floor slat members in sets and groups with one set of floor slat members for each drive unit and each group including adjacent floor slat members, one from each set. The conveyor further comprises a plurality of longitudinally spaced transverse drive beams, one for each drive unit. Preferably, each transverse drive beam is connected to the cylinder component of its drive unit and to each of the floor slat members in the set of floor slat members corresponding to the drive unit. Also preferably, each transverse drive beam is clamp connected to its drive unit, and at least one of the transverse drive beams is mounted at least partially on the tubular extension of its drive unit.

According to another aspect of the invention, a reciprocating floor conveyor includes a frame, a plurality of elongated floor slat members mounted on the frame for longitudinal reciprocation, a drive unit, a tubular slide bearing attached to the frame below the floor slat members, and an elongated tubular member. The drive unit is positioned below the floor slat members and includes a piston component and a cylinder component. The piston component has a outer end portion connected to the frame and an inner end portion positioned inside the cylinder component. The cylinder component is connected to at least one floor slat member and has a closed end opposite the piston component. The tubular slide bearing is positioned adjacent the closed end of the cylinder component. The tubular member is connected at one end to the closed end of the cylinder component to travel with the cylinder component. The tubular member extends endwise outwardly from the cylinder component and slidably through the tubular bearing.

A preferred feature of the conveyor is the minimizing of the vertical distance between the drive unit axis and the floor member to which the drive unit is attached. According to a preferred aspect of the invention, the slide bearing, tubular member, and cylinder component have a common longitudinal axis, and the slide bearing has a relatively small radial thickness to help minimize the vertical distance between this axis and the floor slat member that is connected to the cylinder component.

According to yet another aspect of the invention, a drive assembly for a reciprocating slat conveyor includes a plurality of piston-cylinder drive units and a plurality of transverse drive beams, with one drive beam for each drive unit. Each drive unit includes a longitudinally fixed piston component, a moveable cylinder component, and a tubular extension connected to the cylinder component opposite the piston component. Each drive beam is connectable to a separate set of elongated floor slat members. A first connector connects a first drive beam to the cylinder component. A second connector connects a second drive beam to the tubular extension. Preferably, a third connector connects a third drive beam to both the cylinder component and the tubular extension.

In preferred form, each drive beam has a width that is less than the length of its corresponding cylinder component, and the combined width of any two of the drive beams is larger than the length of either of their corresponding cylinders components. The combined length of any of the cylinder components and the corresponding tubular extension is larger than the combined widths of the three transverse drive beams.

Also in preferred form, the opposite ends of each drive unit are mounted on opposite transverse mounting members. The drive beams are mounted between the mounting members such that the drive beams are essentially perpendicular to the drive units.

The main advantages of various aspects of this invention are: 1) improved stability with both ends of each drive unit vertically restrained, 2) reduction of bending moments during reciprocation of the drive unit, 3) vertical closeness of the drive unit to the elongated floor slat, 4) a drive unit that can be mounted to its own floor slat member to provide superior power for extra large loads, and 5) a plurality of drive units that can be mounted to a compact, lightweight frame in a conveyor with a plurality of transverse drive beams that reciprocate within a window of such frame, to provide a compact, lightweight conveyor.

These and other advantages and features will become apparent from a review of the following detailed description of the best mode for carrying out the invention, the drawing, and the claims, all of which comprise the disclosure of the present invention and are included herein by reference.

BRIEF DESCRIPTION OF THE DRAWING

Like reference numerals are used to designate like parts throughout the several views of the drawing, and:

FIG. 2 is a fragmentary top plan view of adjacent floor slat members, with portions of the floor slat members cut away to disclose the two slide bearings;

FIG. 3 is a full-width end elevational view of the floor slat members attached to a floor frame;

FIG. 4 is an end elevational view of the preferred embodiment of one of the slide bearings;

FIG. 5 is an end elevational view of a floor slat member and its slide bearings and guide beam, taken substantially along line 5—5 of FIG. 2, with an I-beam portion shown in section;

FIG. 6 is a fragmentary end elevational view taken substantially along lines 6—6 of FIG. 2, such view showing parts of a floor slat member and an adjacent second floor slat member, and such view depicting particulates in an upwardly opening channel space and showing the particulates restrained by an angle of repose of the particulates from entering a gap between the floor slat members;

FIG. 9 is an enlarged scale fragmentary sectional view taken substantially along lines 9—9 of FIG. 10, depicting each floor slat member attached to a separate linear hydraulic motor in a first preferred embodiment of the invention;

FIG. 10 is a fragmentary top plan view of two adjacent floor slat members depicting the drive attachment to the floor slat members shown in dashed lines;

FIG. 11 is a side elevational view of the adjacent floor slat member and drive attachments of FIG. 10;

FIG. 12 is a top plan view of the cylinder barrel shown in FIGS. 9–11, showing supporting framework for a floor slat member;

FIG. 13 is a sectional view taken through the cylinder barrel substantially along lines 13—13 of FIG. 12;

FIG. 14 is a side elevational view of the cylinder barrel of FIG. 12, with the bolts heads holding the end clamps together not shown;

FIG. 17 is a sectional view of an alternate embodiment of a floor slat member, such view showing overlaying channels including an overhanging side flange, and such view showing an angle of repose formed in the material to restrain the material, and showing the side flange positioned to protect an overlay seal member and a lower second seal member;

FIG. 18 is an enlarged section view of the overlay seal member;

FIG. 19 is an enlarged section fragmentary view of the overlay seal member in relationship to a side flange and a second wall portion;

FIG. 20 is an exploded pictorial view of the first preferred embodiment of the conveyor viewed from below with portions omitted for clarity;

FIG. 21 is a pictorial view of the drive unit of FIGS. 9–14 and 20 viewed from below and fully assembled, with the bearing mount omitted;

FIG. 22 is a pictorial view of one end of the drive unit shown in FIG. 20 and its bearing mount;

FIG. 23 is a end elevational view of the slide bearing shown in FIG. 22;

FIG. 24 is a cross-sectional view of the slide bearing taken substantially along line 24—24 of FIG. 23;

FIG. 25 is a sectional view of the drive unit and bearing mount of FIGS. 21 and 22 and the transverse mounting members of FIG. 20, with the drive unit shown fully retracted;

FIG. 26 is a view like FIG. 25 except with the drive unit in the fully extended position;

FIGS. 29–31 are alternate versions of the first preferred embodiment drive unit of FIG. 20 depicting various check valve alternatives;

FIG. 32 is a pictorial view of a plurality of drive units of the second preferred embodiment viewed from below and depicting an alternate bearing mount, frame, and clamping structure;

FIG. 34 is a side elevational view of FIG. 33 with a longitudinal frame member shown in cutaway;

FIG. 35 is a pictorial view of the tubular extension and bearing mount of FIG. 32 with portions of the tubular extension and bearing mount shown cut away;

FIG. 36 is an enlarged partial cross-sectional view of the drive unit of FIGS. 32 and 34 depicting an internal check valve in its fully seated position;

FIG. 37 is a view like FIG. 36, except that the valve is in its fully open position.

BEST MODE FOR CARRYING OUT THE INVENTION

The reciprocating floor conveyor (RCF) of the present invention includes conveyor slats or floor slat members that are moved in one direction to advance a load and are retracted in the opposite direction. In preferred form, the floor slat members are divided into three sets. All of the floor slat members are moved in unison in a first direction to advance the load. The floor slat members are then retracted either one at a time or one set at a time in the opposite direction, depending on the embodiment, until all floor slat members are back at a "start" position. The operation is then repeated. The present invention may also be used in a RCF in which more than one half of the floor slat members are always advancing while the remaining floor slat members are returning at a higher rate of speed. Further, the present invention can be used for RCF's having any sequence of operation.

RCF's in general utilize various types of drive mechanisms for reciprocating the floor slat members. Examples of drive mechanisms are set forth in my aforementioned U.S. Pat. No. 5,325,763 and in my U.S. Pat. No. 4,748,893, granted Jan. 7, 1988, and entitled, "Drive/Frame Assembly for a Reciprocating Floor." Drive assemblies include individual drive units that may be linear hydraulic motors, such as that disclosed in my U.S. Pat. No. 5,325,763. The present invention provides an improved drive unit and an improved drive assembly. Two preferred embodiments of the drive assembly are discussed below in detail.

The conveyor frame may be composed of longitudinally spaced apart transverse frame members, sometimes referred to as "sills," which serve to support and guide the floor members, and longitudinal frame members to which the transverse frame members are connected. Examples of conveyor frames are set forth in my U.S. Pat. No. 4,474,285, granted Oct. 2, 1984, entitled, "Drive Unit Mount for Reciprocating Floor Conveyor," and in my U.S. Pat. No. 5,350,054, granted Sep. 27, 1994, and entitled, "Ball Block for Mounting Linear Motor."

In prior art conveyors, the floor slat members are supported by and move on a plurality of bearings, which, in turn, are mounted on a plurality of longitudinal guide beams. The preferred embodiments of conveyors of the invention shown and described herein utilize guide beams and an associated bearing which are part of the prior art, but in combination with a new floor slat configuration, and a new bearing mount, as discussed in more detail later. The slat configuration and slat bearing are the subject matter of my aforementioned parent application Ser. No. 08/390,759.

Figure 1:
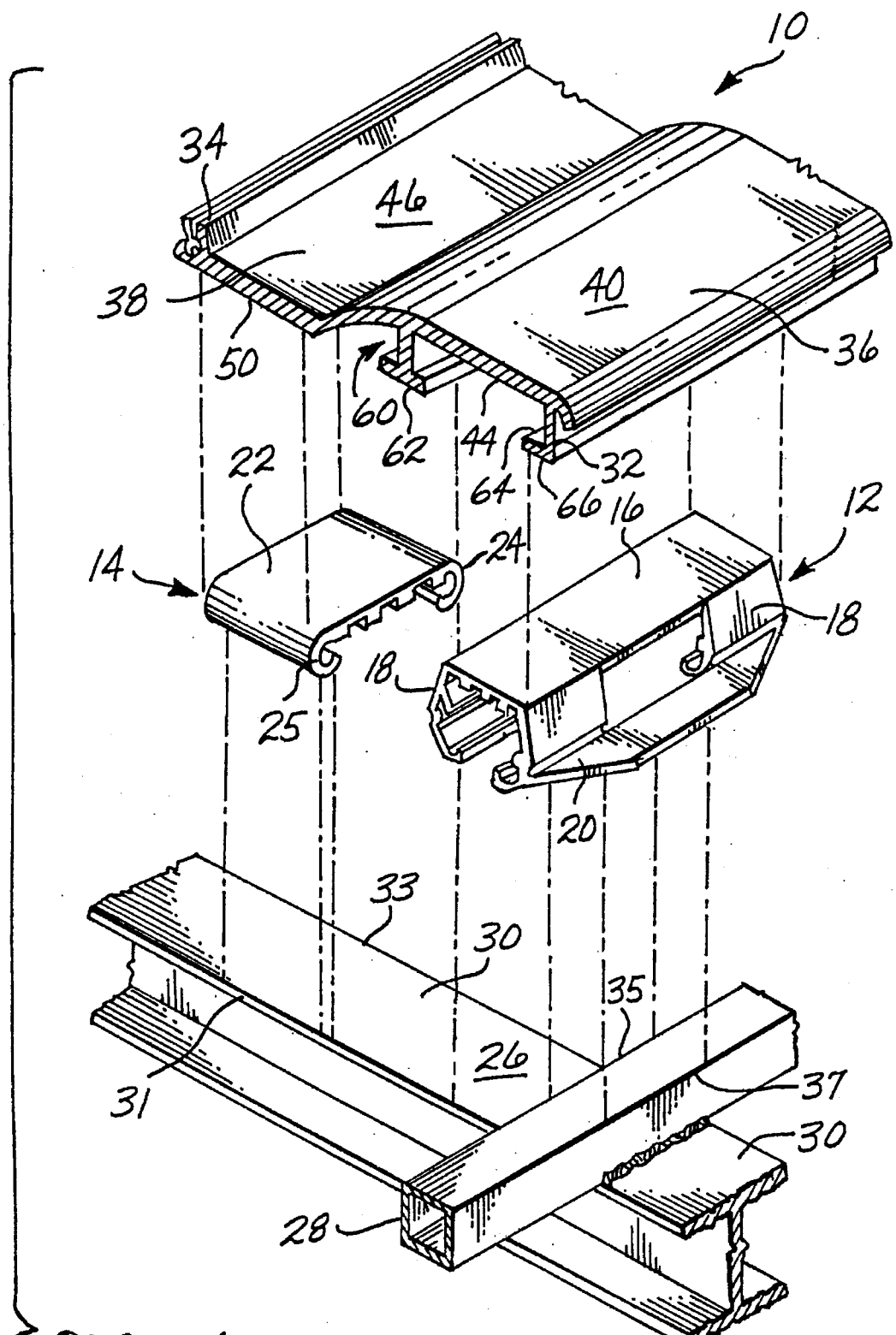
FIG. 1 is an exploded fragmentary pictorial view of two slide bearings spaced above a guide beam and a floor slat member spaced above the bearings.

The first preferred embodiment of the present invention is shown in FIGS. 1–31. Referring to FIGS. 1–3, the conveyor floor comprises a plurality of side-by-side floor slat members 10, each of which rides on a pair of bearings 12, 14. In preferred form, the bearings 12, 14 are snap fitted onto portions of the framework. Large bearing 12 is preferably like the bearings disclosed in FIGS. 11–15 of my aforementioned U.S. Pat. No. 4,785,929. It includes a top portion 16, a pair of sidewalls 18, and a pair of wings 20 that extend perpendicularly from sidewalls 18. Small bearing 14 is a new design and has a top portion 22 and a pair of inwardly curving hook portions 24, 25. FIG. 4 depicts an alternate and preferred embodiment of small bearing 14.

The framework members important to the embodiment of FIGS. 1–31 are a plurality of transverse frame members 26 and a plurality of longitudinal guide beams 28. Transverse frame members 26 are spaced apart longitudinally of the conveyor in the manner disclosed by my aforementioned U.S. Pat. No. 4,474,285, for example. In preferred form, longitudinal guide beams 28 are square tubular members and may measure one inch by one inch in cross-section, although other shapes or sizes may be used. The guide beams 28 mount perpendicularly to transverse frame members 26 and are welded to an upper flange 30, as is shown in FIG. 1. Transverse frame member 26 is shown as an I-beam member, but may be other shapes, such as tubular, channel-shaped, or Z-shaped. Small bearing 14 snaps onto upper flange 30 at 31, 33. Large bearing 12 snaps on guide beam 28 at 35, 37.

Referring to FIG. 5, each floor slat member 10 includes a first sidewall 32 and an oppositely spaced second sidewall 34. Between first and second sidewalls 32, 34 are integrally-formed first and second channel portions 36, 38. First channel portion 36 is downwardly opening and includes a top panel 40 having a top surface 42 and a bottom surface 44. Second channel portion 38 is upwardly opening and has a bottom panel 46 formed integrally with second sidewall 34. Bottom panel 46 includes a top surface 48 and a bottom surface 50. A generally vertical leg 52 extends longitudinally of first and second channel portions 36, 38 and laterally between the first and second sidewalls 32, 34. Leg 52 includes a generally vertical web 54, a top portion 56, which is an extension of top panel 40 and is generally perpendicular to web 54, and bottom flange 58, which is also generally perpendicular to web 54 and at the opposite end of top portion 56. The top portion 56, the web 54, and bottom flange 58 form essentially an I-beam 60, which adds structural support and strength to the floor slat members. Bottom flange 58, having a bottom surface 62, extends laterally in both directions from web 54.

First sidewall 32 includes a bottom flange 64 having a bottom surface 66. Flange 64 extends laterally and generally perpendicularly from first sidewall 32. Bottom surface 66 of first sidewall 32 is coplanar and parallel to bottom surface 62 of flange 58. A generally central, curved channel wall 68 is positioned between bottom panel 46 and top portion 56 of web 54. Second channel portion 38 comprises channel wall 68, bottom panel 46 and second sidewall 34. Channel wall 68 joins top panel 40 at top portion 56 of I-beam 60 at a transition region 70. Channel wall 68 curves outwardly then downwardly from the top panel into the channel wall 68.

Second sidewall 34 holds a flexible, elongated seal member 72. Elongated seal member 72 is positioned inside a narrow channel 74 inside second sidewall 34. The elongated seal member is made of an elastomeric material and may include two legs at one end for better fit in the narrow channel, like the seal member described in my U.S. Pat. No. 4,896,761, granted Jan. 30, 1990, and entitled, "Reciprocating Conveyor Floor Members and Seals."

Figure 7:
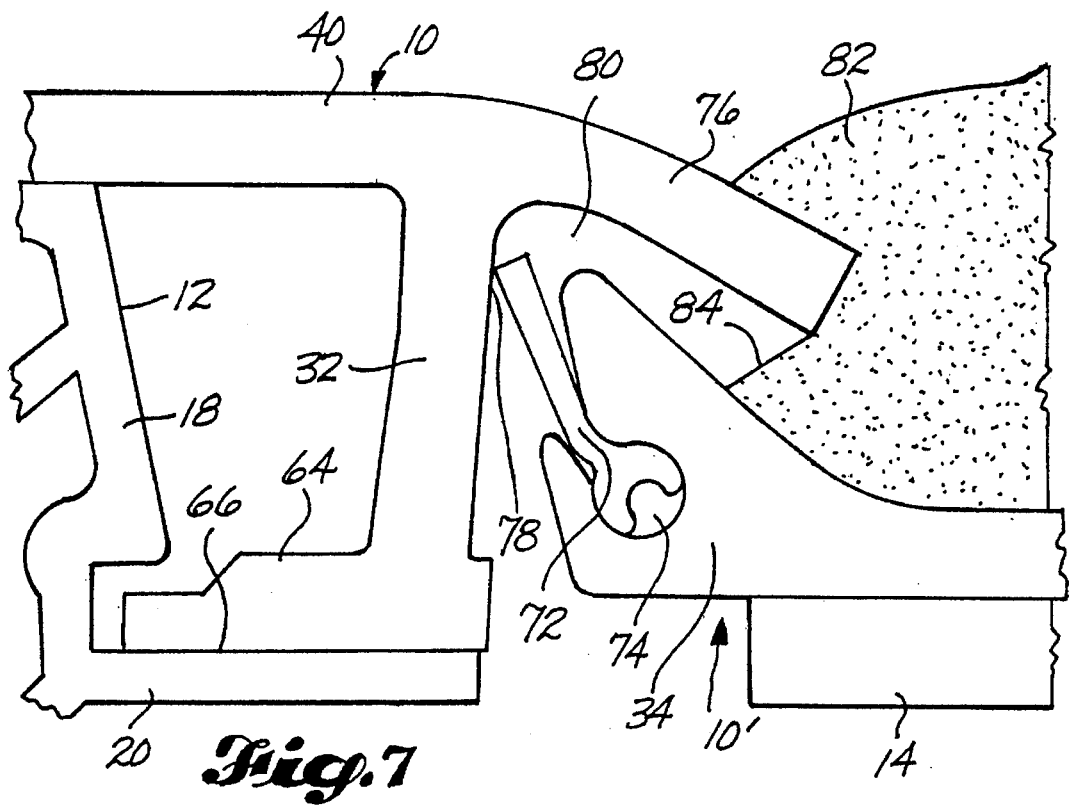
FIG. 7 is an enlarged scale fragmentary end elevational view depicting a seal member of a second floor slat member contacting a seal member receiving surface of an adjacent first floor slat member and depicting a gap that is generally vertically between an overhanging side flange on the first floor slat member and a sidewall of the adjacent second floor slat member, such view showing the granular material assuming an angle of repose at the outer edge of the overhanging side flange.
Figure 8:
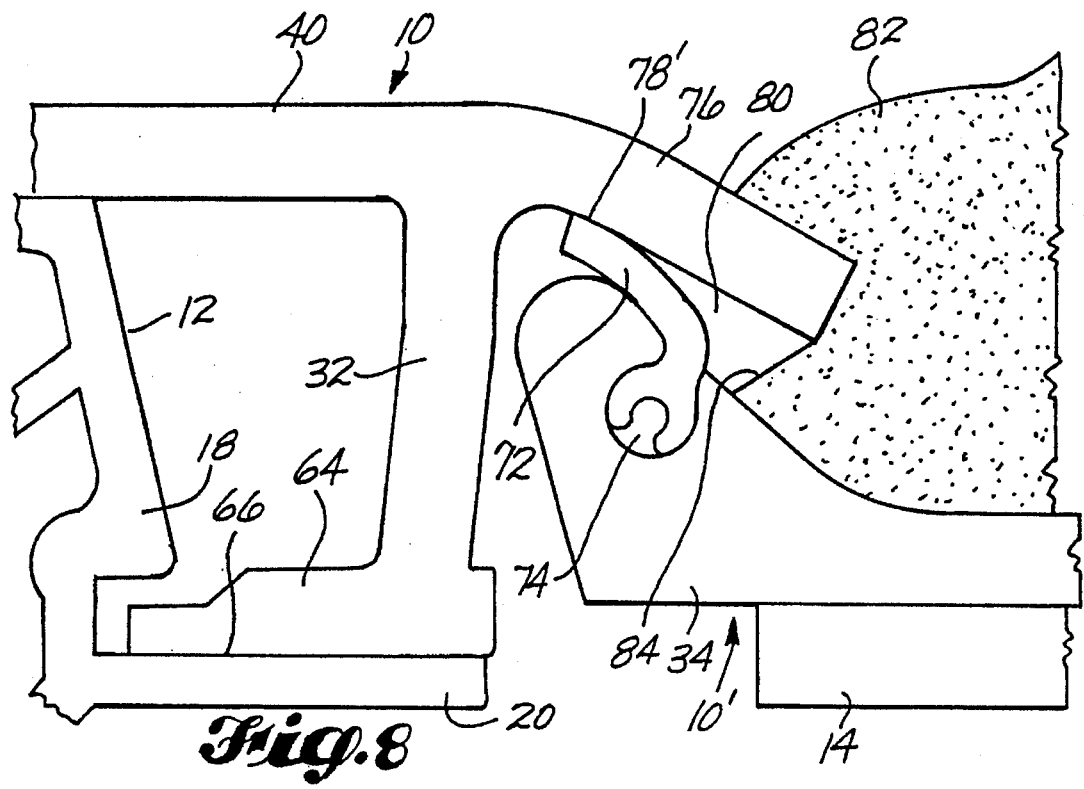
FIG. 8 is a view like FIG. 7 but of an alternate seal member design including a seal receiving surface on the bottom of the side flange and a seal member angled upward and outward to contact the new seal member receiving surface.

The top panel 40 extends laterally past first sidewall 32 to form a side flange 76. Side flange 76 extends downwardly and outwardly to extend over both second sidewall 34 and elongated seal member 72 of adjacent floor member 10', better depicted in FIGS. 6–8. Elongated seal member 72 contacts a seal member receiving surface 78. Referring to FIG. 7, seal member receiving surface 78 is a surface below side flange 76, and on the first sidewall 32. An alternate embodiment of seal member receiving surface 78 is shown in FIG. 8, where seal member 72 contacts a seal receiving surface 78' of side flange 76.

Referring to FIGS. 1 and 5 again, in assembled condition, floor slat member 10 rests on bearings 12, 14. Specifically, bottom surface 44 of top panel 40 rests on top portion 16 of bearing 12. Bottom surface 50 of bottom panel 46 rests on top portion 22 of small bearing 14. Bottom surfaces 62, 66 of I-beam 60 and first sidewall bottom flange 64, respectively, rest directly on or are slightly above wings 20 of large bearing 12. Wings 20 provide mutual bracing. When installed, bottom surface 50 of bottom panel 46 is in offset parallelism with bottom surfaces 62 and 66, as shown in FIG. 5.

Referring again to FIG. 6, side flange 76 overhangs second sidewall 34 and elongated seal member 72 to form a narrow generally vertical gap 80. Gap 80 is defined by and vertically between side flange 76 and second sidewall 34. The side flange 76 protects the elongated seal member from solid particulates and liquids by blocking the particulates from direct access to the elongated seal member 72. Referring also to FIGS. 7–8, particulates 82 on top of floor slat members 10 form an angle of repose at 84. Because of the position of the side flange 76 over the second sidewall 34, particulates 82 generally do not come into contact with the elongated seal member 72, thereby adding extra sealing security and lengthened life for the seal.

FIGS. 9–14 and 20–31 depict the first preferred embodiment of the conveyor. The conveyor includes a plurality of drive units, each of which is a linear hydraulic motor M. Each floor slat member 10 is mounted to its own motor M in this first embodiment, as best shown by FIGS. 9 and 20. Each motor M is connected to its corresponding floor slat member 10 via a barrel clamp 99, as best shown in FIGS. 12–14. The barrel clamp 99 allows motor M to be vertically close to the floor slat member 10, which reduces misalignment of motor M during operation of the conveyor. A large elongated shoe pad 86 and a small elongated shoe pad 88 connect two end clamps 162, 164 to form the barrel clamp 99. Top panel 40 mounts to the large shoe pad 86. Bottom panel 46 mounts to the small shoe pad 88. In preferred form, the top and bottom panels are bolted with countersunk bolts 87 to the large and small shoe pads 86, 88, respectively.

Motor M is an extensible-length piston-cylinder drive unit having a longitudinally fixed piston component 90 and a movable cylinder component 92 that moves with the floor slat member 10.

The piston component 90 includes an outer end portion 166 and an inner end portion. The inner end portion includes a piston head 170. The piston component 90 also includes a piston rod 91 that extends outwardly from the piston head 170. The outer end portion 166 of piston component 90 includes a ball end 98 that is received in a ball socket 172 within a two-part ball block housing 100 (FIGS. 20–21 and 25–26). The ball block 100 has an upper housing portion 174 and a lower housing portion 176 that together form the socket 172 to securely hold ball end 98 in place and prevent relative longitudinal movement. By way of example, the ball block 100 may be like that described in my U.S. Pat. No. 5,390,781, granted Feb. 21, 1995, and entitled "Mounting Assembly And Method For Reciprocating Slat Conveyor," or my U.S. Pat. No. 5,427,229, granted Jun. 27, 1995, and entitled "Control System For Reciprocating Floor Conveyor." The ball block 100 mounts to a transverse mounting member 160 that attaches to the main framework of the trailer or bunker.

The cylinder component 92 includes a cylinder barrel 94 mounted to travel on the piston head 170 and having a first end 178 and a second closed end 180. The first end 178 includes a cylinder head 96, through which the piston rod 91 extends. At the second end 180 of cylinder barrel 94 is a cylinder plug 97. An axially-extending tubular extension 102 is attached to the cylinder plug 97 at the second end 180 and travels with the cylinder barrel 94. The tubular extension 102 has an outer diameter that is about ten to fifteen percent less than the diameter of the cylinder barrel 94.

Referring particularly to FIGS. 20–24, tubular extension 102 extends through an axial opening 182 of a fixed tubular slide bearing 104. Slide bearing 104 has a tubular bearing member 183, (shown in FIGS. 22–24) which has an inside diameter of approximately 3.05 inches and an outside diameter of approximately 3.5 inches, and which surrounds the tubular extension 102. The inner surface of bearing member 183 provides a bearing surface for slidably supporting tubular extension 102. An annular housing 185 surrounds the bearing member 183. The inside diameter of the housing 185 is approximately 3.5 inches, and the outside diameter is approximately 4.0 inches. The relatively small radial thickness of the bearing 104 helps minimize the vertical distance between the longitudinal axis of the motor M and the floor slat member to which the motor M is attached.

Still referring to FIGS. 20–24, the housing portion 185 of each slide bearing 104 has two opposite laterally extending flanges 187. These flanges are secured to two laterally spaced, vertically oriented channel members 186 by a plurality of bolts 103. Each channel member 186, except the two channel members 186 on the lateral edges of the drive assembly, has secured thereto adjacent flanges 187 of adjacent slide bearings 104. A steel plate 189 extends across and is secured to the tops of the channel members 186 to stabilize and strengthen them. It is preferably welded to the channel members 186. The plate 189 is omitted in FIG. 20 to simplify illustration of the system. The slide bearing 104 and the respective channel members 186 form a bearing mount 184 for the respective motor M. The bearing mount 184 is secured to a Z-shaped transverse mounting member 188, preferably by welding the channel members 186 to the transverse member 188. The transverse member 188 is secured to a portion of the framework of the structure in which the conveyor is installed (not shown). Slide bearing 104 guides tubular extension 102 so as to restrict cylinder barrel 94 to linear, reciprocating movement. Tubular extension 102 in conjunction with slide bearing 104 also provides structural support to motor M.

Referring to FIGS. 12–14, the two end clamps 162, 164 of barrel clamp 99 comprise a first upper end clamp 106 and a first lower end clamp 110 that make up end clamp 164 and a second upper end clamp 108 and a second lower end clamp 112 that make up end clamp 162. End clamp 164 has opposite laterally extending step-like projections 190 (FIGS. 12, 21, 22 and 28). Each two-part end clamp 162, 164 is constructed to cradle cylinder barrel 94. Bolts 111 fasten first upper clamp 106 to first lower clamp 110 and second upper clamp 108 to second lower clamp 112. Shoe pads 86, 88 span between and connect first upper clamp 106 and second upper clamp 108. Countersunk bolts 87 secure floor members 10, 10' to the shoe pads 86, 88. Shoe pads 86, 88 are, in turn, connected at their ends to the upper end clamps 106, 108. A plurality of angle brackets 114 (also called gussets) provide additional structural support to barrel clamp 99.

FIGS. 25 and 26 depict the inner portions of motor M in its extended and retracted positions. These portions of the drive unit are similar to those shown in my U.S. Pat. No. 5,193,661, granted Mar. 16, 1993, and entitled "System of Linear Hydraulic Motors." However, in the patent, the cylinder end of the motor is shown and described as being attached solely to a floor member. In accordance with the present invention, both ends of the motor M are attached to and vertically restrained by mounting structures that are secured to the framework. The motor M, including the tubular extension 102, forms a structural beam that supports the floor member attached thereto and efficiently transmits loads created by operation of the conveyor to the framework.

Figure 28:
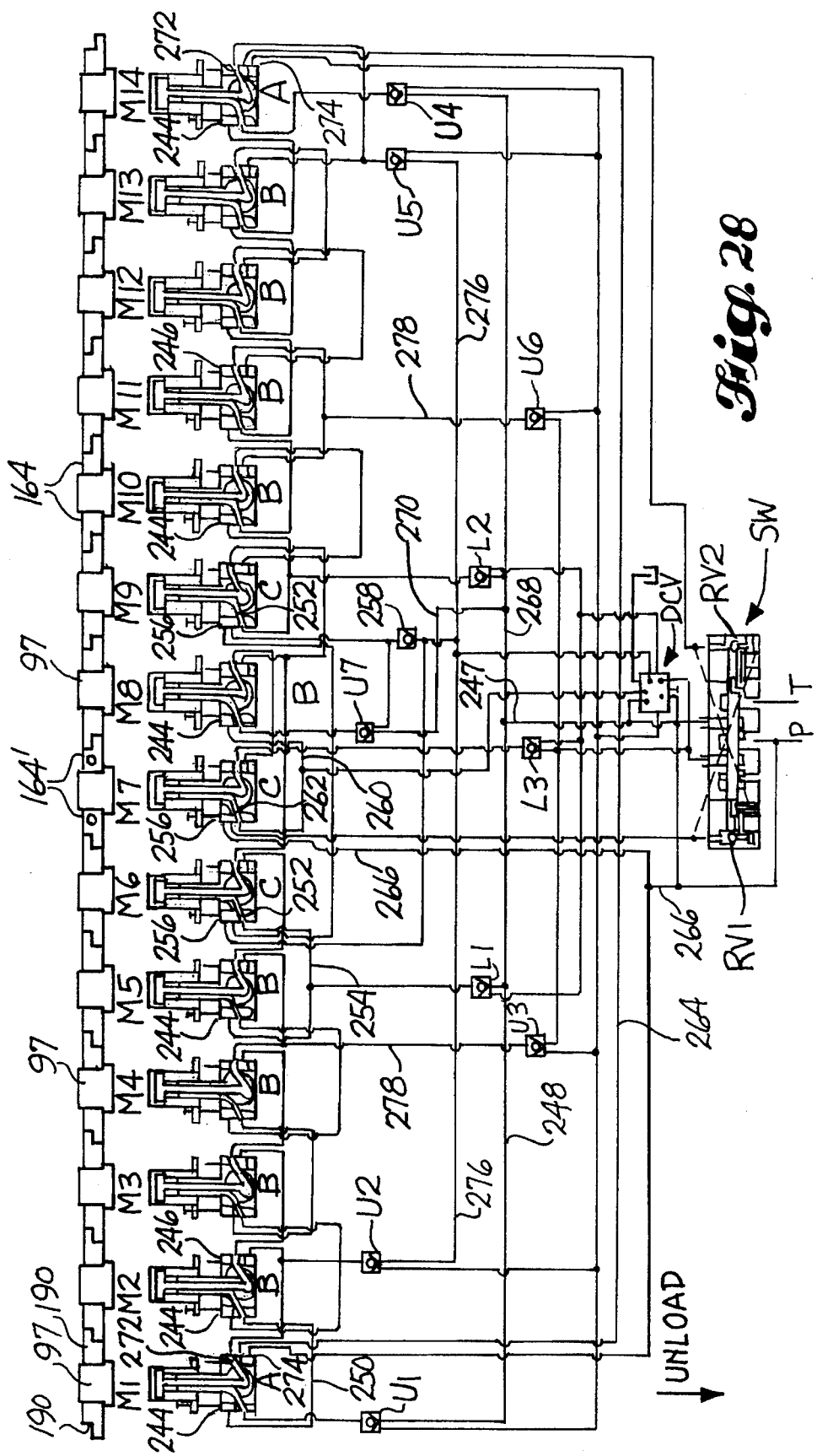
FIG. 28 is a schematic view depicting the control system for the first preferred embodiment with a plurality of end clamps with step-like protrusions shown in plan view.

The piston head 170 is received in the cylinder barrel 94 and slidably and sealingly engages the inner cylindrical sidewall of the cylinder barrel 94. A first cylindrical working chamber 192 and a second annular working chamber 193 are defined between the piston 170 and the cylinder plug 97, and the piston head 170 and the cylinder head 96, respectively. An axial passageway extends through the piston rod 91 to supply hydraulic pressure to the working chambers 192, 193. A center tube 194 divides the axial passageway into a center passageway 195 and an annular passageway 196 surrounding the center passageway 195. These passageways 195, 196 communicate with working chambers 192, 193, respectively. They also communicate with generally radial passageways 197, 198 through the ball end 98 of the piston component. Radial passageways 197, 198 are in communication with passageways in the lower housing portion 176 of the ball block 100 (FIG. 28). The passageways in the ball block housing portion 176 are connected to hydraulic conduits for selectively connecting the working chambers 192, 193 to hydraulic pressure and return. The control system and the operation of the motors M are described further below.

Figure 27:
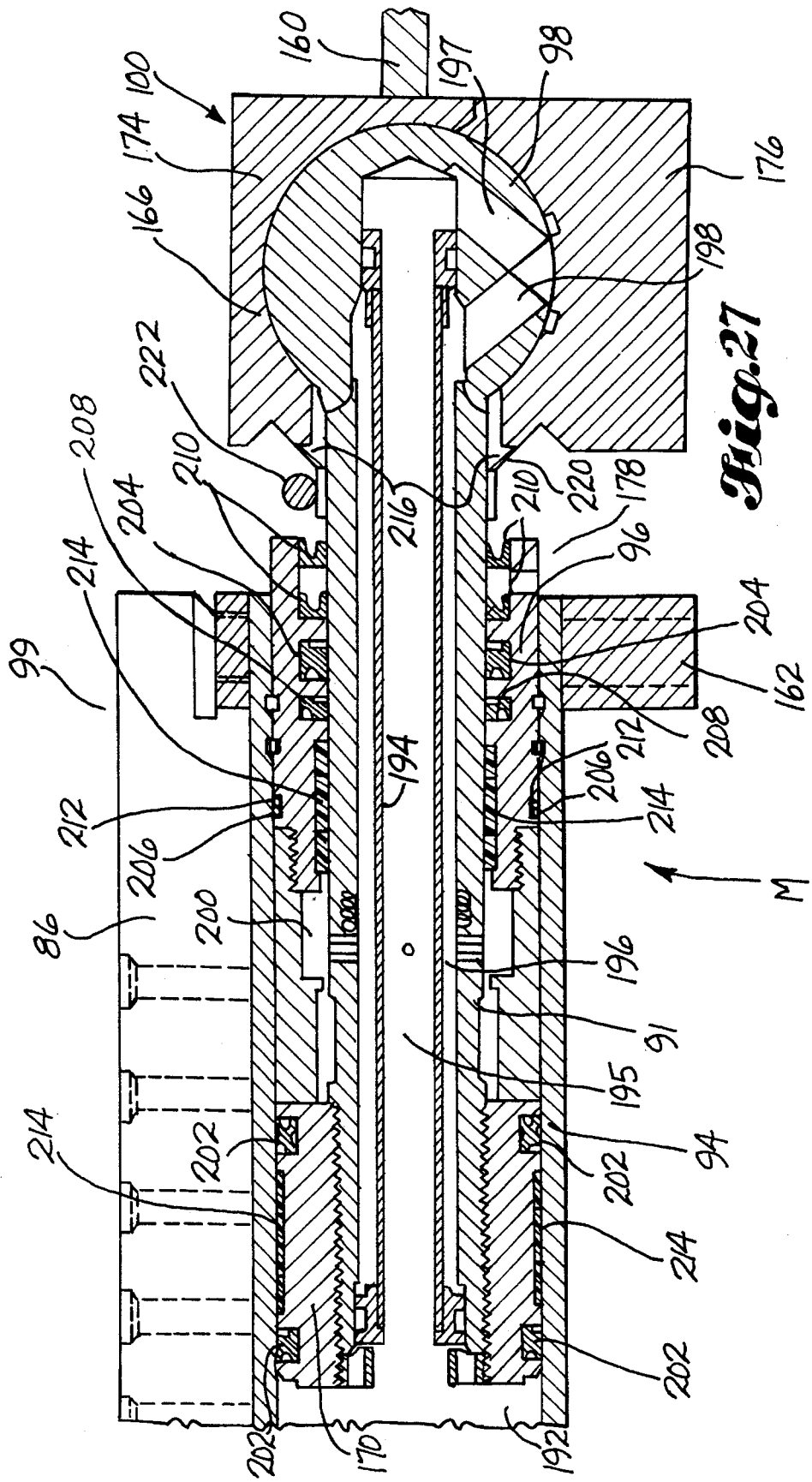
FIG. 27 is an enlargement of a portion of FIG. 25 depicting a plurality of seals and wear rings.

A valve ring 199 (FIGS. 29–31), which is used to provide an end of stroke cushion for motor M, may be provided in a space shown at 200 (best seen in FIG. 27). The valve ring is preferably like that which is described in my U.S. Pat. No. 5,313,872, granted May 24, 1994, and entitled "End of Stroke Cushion for A Linear Hydraulic Motor," and will not be further discussed herein.

Referring to FIG. 27, which is an enlargement of a portion of FIG. 25, piston head seals 202, cylinder head/rod seal 204, O-ring 206, buffer seal 208, and wipers 210 are provided in motor M to prevent hydraulic fluid from escaping from the working chambers 192, 193 and leaking from the cylinder. In preferred form, the piston head seals 202, the buffer seal 208, and the wipers 220 are polyurethane seals. By way of example, and not to be limitive, the seals may be PARKER part numbers P4700A90, made by the Parker Hannifin Corporation, Salt Lake City, Utah, USA. The cylinder head/rod seal 204 may be like PARKER part no. P4300A90 and also made of polyurethane. The O-ring 206 is also polyurethane, and preferably includes a back-up ring 212. Back-up rings 212 may also be used with the piston head seals 202 and the cylinder head/rod seal 204. The back-up rings may be made of Nylatron (trademark).

A plurality of wear rings 214, which are essentially cylindrical sleeves with a longitudinal slit to aid installation, may be employed between the inner sidewall of the cylinder barrel 94 and the piston head 170. Wear rings 214 may also be used between the piston rod 91 and the cylinder head 96. In preferred form, three wear rings are adjacently arranged and installed in each location. An example of a suitable material for the wear rings is a material comprising polyester, glass, and/or graphite in a standard resin matrix, such as the material sold under the trademark Orkot TLG-S. The inside diameter of each wear ring 214 is approximately 1¾ inches, and the ring 214 is approximately 0.120–0.125 inch thick and approximately 0.500–0.510 wide. Use of the wear rings 214 hinders lateral movement of motor M during operation and protects the piston and cylinder components from wear. The wear rings 214 strengthen and stiffen motor M to enhance its functioning as a structural beam. In addition, the wear ring 214 is relatively inexpensive to replace.

A rod dust seal 216 may be used to seal the outer end of the passageway in the ball block 100 through which the piston rod 91 projects. The dust seal 216 is an annular member surrounding the piston rod 91 and has an angled flange 220 that deflects dirt and dust from entering the ball block. The dust seal 216 may be held in place around the piston rod 91 via a hose clamp 222, as shown in FIG. 27.

Referring back to FIGS. 25 and 26, the cylinder plug 97 is welded to both the tubular extension 102 and to the cylinder barrel 94. The welds are shown at 224. Stepped end clamp 164 mounts the barrel clamp 99 to the motor M at the cylinder plug 97. The other end clamp 162 mounts the other end of the barrel clamp 99 to the cylinder barrel 94 radially adjacent the cylinder head 96.

Figure 28A:
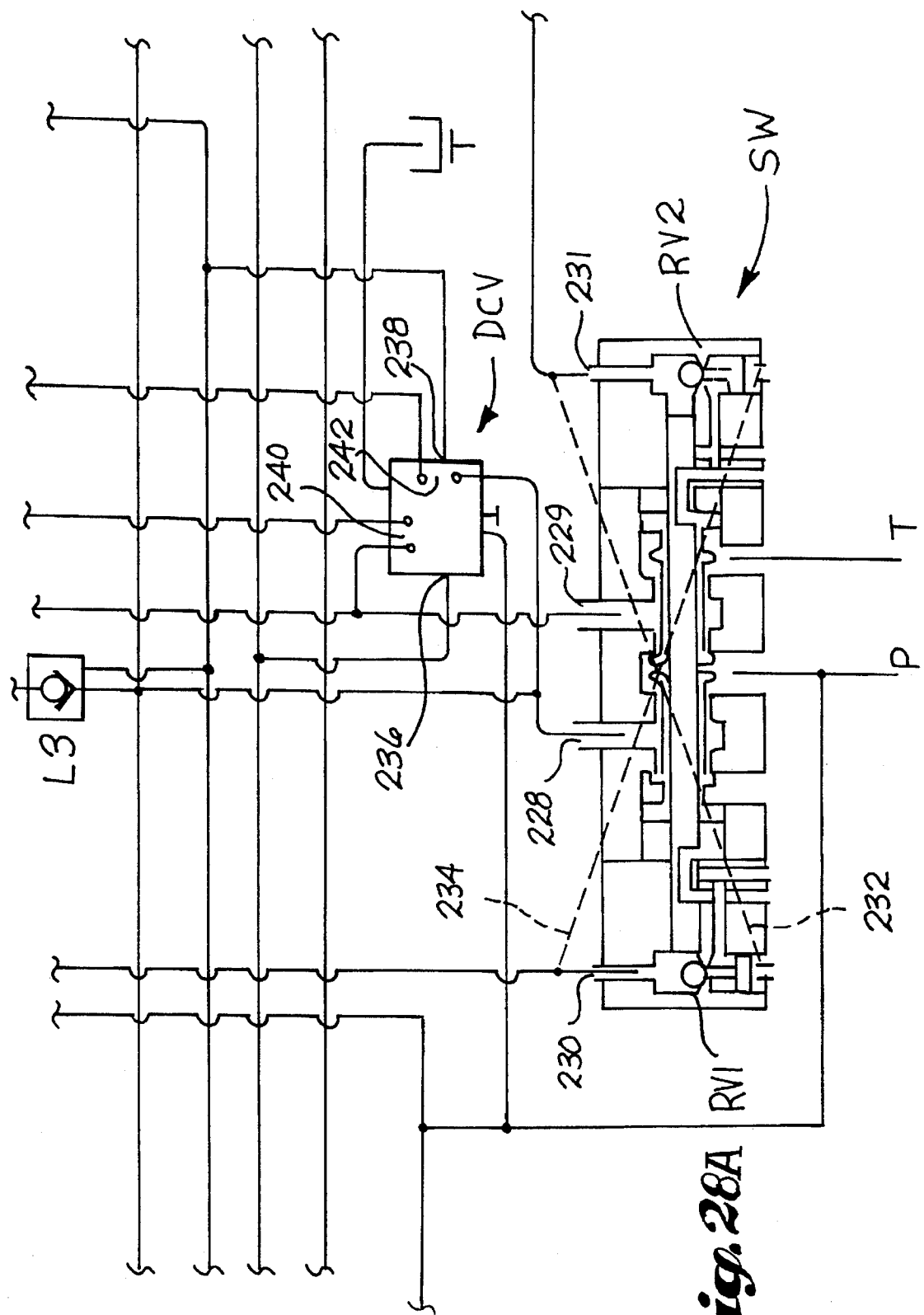
FIG. 28A is an enlarged schematic view of the portion of FIG. 28 including the switching valve and the directional control valve.

FIGS. 28 and 28A show schematically the drive and control system for the first preferred embodiment illustrated in FIGS. 1–31. The system includes a switching valve SW that is preferably of the type disclosed in my co-pending application Ser. No. 08/495,949, filed Jun. 28, 1995, and entitled "Hydraulic Drive and Control System." The description of the switching valve in that application is incorporated herein by reference. Referring to FIGS. 28 and 28A, the valve SW has two inlet ports connected to pressure P and tank (return) T, respectively. In operation, the valve SW has two positions in which it selectively connects first and second outlet ports 228, 229 to pressure and return. The two valve positions correspond to two positions of a control rod that is shifted back and forth hydraulically. Relief valves RV1, RV2 permit the shifting of the control rod. Pressure is selectively supplied to valves RV1, RV2 via first and second pilot passageways 230, 231. The operation of the switching valve SW is described in detail in my aforementioned U.S. application Ser. No. 08/495,949. The main difference between the valve disclosed therein and the valve in the first preferred embodiment of the present invention is that the passageways that interconnect valves RV1, RV2 are internal passageways, rather than external conduits. The interconnecting passageways are shown in broken lines in FIG. 28A and are given the reference numerals 232, 234. The provision of the passageways in the form of internal passageways or as external conduits, in itself, has no effect on the operation of the switching valve SW.

Referring to FIG. 28A, the system also includes a directional control valve DCV. The valve DCV is manually operated and is preferably a solenoid valve. It has two positions corresponding to conveying a load in the unload direction and in the load direction, respectively. The valve DCV has inlet ports connected to pressure P and tank T, respectively. Two outlet ports 236, 238 are selectively connected to pressure or return by the valve DCV. In addition, there are two pathways 240, 242 through the valve which are selectively opened and closed by the valve DCV.

Referring to FIG. 28, the system includes fourteen hydraulic motors M, designated M1–M14. Each of the motors M1–M14 has two external check valves associated therewith. The check valves are mounted in the lower housing portion 176 of the ball block 100 that receives the ball end 98 of the respective motor M, as shown in FIGS. 21 and 29–31. One of the check valves is a pull valve with a control rod 226 extending outwardly therefrom and an abutment 227 on the outer end of the control rod 226. The rod 226 extends through the lower end clamp 112 of the motor M so that, as the motor M is extending and is nearing its fully extended position, the lower end clamp 112 engages the abutment 227 to mechanically unseat the valve plug of the pull valve. The other check valve associated with each motor M is a push valve that is engaged by lower end clamp 112 as the motor M nears its fully retracted position.

In FIG. 28, each of the motors M1–M14 is designated either "A", "B", or "C". These letter designations indicate variations in the manner in which the push and pull valves relate to the functioning of the respective motors. In the motors M2–M5, M8, and M10–M13, which are designated "B", both valves block or open communication with the working chambers 192, 193 of the motors during portions of the operational sequences of the motors. The push valves 246 control communication with the first working chambers 192, and the pull valves 244 control communication with the second working chambers 193. In motors M1, M14, designated "A", the pull valve 244 is the same as in the "B" motors, but the push valve 274 has no effect on communication with either working chamber 192, 193. In the "C" motors M6, M7, M9, the push valves 246 are the same as in the "B" motors, but the pull valves 256 have no effect on communication with either working chamber 192, 193. In the description of the operation of the push and pull valves set forth below, the terms "valve chamber" and "pressure chamber" are used. Pressure in a valve chamber tends to hold the valve open. Pressure in a pressure chamber tends to hold it closed.

Still referring to FIG. 28, the system includes a plurality of piloted check valves U1–U7, L1–L3. When pressure is supplied through the pilot line to each of these valves, the valve is held open to allow pressure flow through the valve in either direction. When the pilot line is connected to return, the valve U1–U7, L1–L3 operates as a check valve and allows flow in only one direction. The pilot lines of valves U1–U6 are connected to pressure during an unload operation and are connected to return during a load operation. The pilot lines of valves L1–L3 are connected to pressure during a load operation and to return during an unload operation. The pilot line of valve U7 is controlled by unpiloted check valve 258 and pull valves 256 on motors M6 and M9, as described further below. The preferred structure of the piloted check valves U1–U7, L1–L3 is illustrated in FIGS. 28D, 28E, and 28F. The piloted check valve PV shown therein has a pilot port PP leading into a pilot chamber PC, an inlet port IN, and an outlet port OUT leading out to one or more of the motors M. It also has a valve plug VP. FIGS. 28D, 28E, and 28F show the valve PV in a closed position, an open position, and a piloted open position, respectively.

In the operation of the drive and control system, a load may be conveyed in the unload direction, indicated by the "UNLOAD" arrow in FIG. 28 or in the opposite load direction. During the unload sequence of operation, the valve DCV is in a first position in which the outlet port 236 is connected to pressure and the outlet port 238 is connected to return. The pathway 242 through the valve is open to allow flow through the pathway 242. The pathway 240 is blocked. Pressure flow out through port 236 is communicated to the pilot lines of check valves U1–U6 to open these valves. The pilot lines of check valves L1–L3 are connected to return via outlet port 238.

At the start of the cycle, all of the motors M1–M14 are in their fully extended positions in which the lower end clamps 112 are in engagement with the abutments 227 to hold the pull valves 244, 256 open. The switching valve SW is in a first position in which outlet port 229 is connected to pressure and outlet port 228 is connected to return. Pressure is supplied to the working chambers 193 of all fourteen motors to move the motors simultaneously in the unload direction and convey the load on the conveyor in that direction.

Pressure flows out through switching valve port 229, through conduits 247, 248 and check valve U1 and into working chamber 193 of motor M1. At motor M1, the pressure also flows through the open pull valve 244 through conduit 250 to the working chamber 193 of motor M2 and through the open pull valve 244 of motor M2 to the working chamber 193 of motor M3. Similarly, the pressure is communicated from motor M3 to motor M4 to motor M5. Pressure flows through the open pull valve 244 of motor M5 and through conduit 254 and bypass passageway 252 of motor M6 into working chamber 193 of motor M6. Bypass passageway 252 and working chamber 193 of motor M6 are also connected to pressure via check valve L1, conduit 247, and port 229. Pressure is supplied to the working chambers 193 of motors M14–M9 in the same manner via switching valve outlet port 229, conduits 247, 268, and check valves U4, L2. Pressure is supplied to motor M8 via outlet port 229, conduit 268, conduit 270, and check valve U7. At motor M8, pressure flows through the open pull valve 244 out through conduit 260 and into motor M7 via bypass passageway 262.

The motors M1–M14 move simultaneously in the unload direction. As the clamp portions 112 move out of engagement with the abutments 227, the pull valves 244 of motors M1–M5, M8, and M10–M14 are maintained in their open positions by pressure in the valve chambers acting on the valve plugs.

The presence of the check valves 244 in the pressure flow pathways tends to restrict the flow into motors M2–M5, M7, M10–M13. Pressure flow into motors M1, M8, M14 is relatively unrestricted since it is directly through the valve chamber of the pull valve 244 rather than past the valve plug thereof. Flow into motors M6, M9 via check valves L1, L2 is also relatively unrestricted. The arrangement of the step-like abutments 190 on the lower end clamps 164, 164' ensures that none of the motors moves faster than the other motors. As illustrated at the top of FIG. 28, each of the motors M1–M6, M8–M14 has an end clamp 164 with a lower stepped portion having laterally opposite step-like abutments that face in opposite axial directions. The corresponding end clamp 164' on motor M7 has laterally opposite steps that both face in the load direction. The steps on the end clamps 164, 164' are interengaged as shown in FIG. 28 to ensure simultaneous movement of the motors M1–M14. The steps on end clamp 164' of motor M7 inhibit faster movement of motors M6, M8. The steps on motors M6, M8 inhibit faster movement of motors M5, M9, and so on to motors M1, M14.

The movement of the motors M1–M14 is permitted by connection of the working chamber 192 of each motor M1–M14 to return. The pressure chamber of push valve 246 of motor M2 is connected to return via open check valve U2, conduit 276, path 242 in valve DCV, and switching valve port 228. A branch conduit also connects the working chamber 192 of motor M1 to return via this pathway and bypass passageway 272 in motor Mi. In motor M2, the connection to return is completed by the opening of push valve 246 caused by return pressure in working chamber 192 of motor M2. The opening of valve 246 also connects the pressure chamber of push valve 246 in motor M3 to return. This valve is also opened by return pressure to similarly connect motor M4 to return, then motor M5 and then motor M6. Working chamber 192 of motor M4 is also directly connected to return via the valve chamber of push valve 246 of motor M4, conduit 278, check valve U3, and switching valve port 228. Motors M14–M9 are connected to return in the same manner as motors M1–M6. The working chamber 192 in motor M8 is connected to return via its open push valve 246 (opened by return pressure) and conduits connecting the pressure chamber of valve 246 to the valve chambers of push valves 246 in motors M6 and M9. Motor M7 is connected to return through its return pressure opened push valve 246 and a conduit connecting the pressure chamber of such valve to the valve chamber of the push valve 246 on motor M8.

The return connections to motors M1, M14, like their pressure connections, are relatively unrestricted compared to the connections to the other motors which are through the return pressure opened push valves 246. As described above, the interlocking step arrangements of the end clamps 164, 164' on the motors M1–M14 prevent faster movement of motors M1, M14 and so on to motor M7.

As described above, the motors M1–M14 move simultaneously in the unload direction. During this movement, the push valve 274 on motor M1 is held closed by a direct connection of its pressure chamber to pressure P via conduit 266. Push valve 274 in motor M14 is blocked by the closed push valve 274 of motor M1. Pull valve 256 on motor M7 is biased closed by a direct connection to pressure P via conduit 266. Closed valve 274 on motor M1, blocked valve 274 on motor M14, and closed valve 256 on motor M7 prevent shifting of the switching valve SW. The line from the valve chamber of valve 256 of motor M7 to pilot port 230 of switching valve SW remains pressurized, and pilot port 231 is blocked by blocked valve 274 on motor M14. As the motors M1–M14 simultaneously near the end of their stroke, the end clamps 162 thereon engage push valves 246,274 to open each of the push valves 246, 274. The mechanical opening of push valve 274 on motor M1 unblocks conduit 264 between such valve and the push valve 274 on M14. Pressure is delivered through conduit 264 and the open valve 274 on M14 to pilot port 231 of switching valve SW. Pressure is also delivered through internal passageway 232 to the piston of valve RV1 to unseat the ball in valve RV1 and allow the pressure in pilot port 231 to shift the switching valve SW. The shifting of the switching valve SW reverses the connections to pressure and return of outlet ports 228, 229.

The connection of port 228 to pressure connects the working chambers 192 of each of the motors M1–M14 to pressure. Working chambers 193 of motors M1, M14 are connected to return via switching valve port 229 and check valves U1, U4, respectively. However, connection of working chambers 193 of motors M2–M6 and M13–M9 are blocked by closed pull valves 244 on motors M1–M5, M14–M10. Pull valve 256 on motor M6 is closed by pressure from conduit 276, pathway 242 in valve DCV, and switching valve port 228. The closing of this valve blocks pull valve 256 on motor M9 which blocks check valve 258 and thereby the pilot line to check valve U7. Check valve U7 is connected to return via conduits 270, 268 and switching valve port 229 and is closed because of the blocking of its pilot line. Closed valve U7 blocks working chamber 193 of motor M8, which in turn blocks bypass passageway 262 and working chamber 193 of motor M7. The blocking of working chambers 193 in motors M2–M13 from connection to return prevents the motors M2–M13 from moving. Therefore, only motors M1, M14 move in their extending direction in which working chambers 193 are contracted and working chambers 192 expand.

When motors M1, M14 near the end of their extension stroke, their pull valves 244 are mechanically opened by engagement of the abutments 227. This connects the working chambers 193 of motors M2, M13 to return to allow motors M2, M13 to extend. Similarly, motors M3–M6 and M12–M9 extend two at a time. When motors M6, M9 near the end of their extension stroke, their pull valves 256 are mechanically opened. This supplies pressure to check valve 258 to open valve 258 and also supplies pressure to the pilot line of check valve U7. The pressurizing of the pilot line opens valve U7 to thereby connect working chamber 193 of motor M8 to return. As motor M8 nears the end of its stroke, its pull valve 244 is mechanically opened to connect working chamber 193 of motor M7 to return and thereby allow motor M7 to extend back to its starting position. The return of motor M7 to its starting position opens its pull valve 256. The opening of pull valve 256 supplies pressure to pilot port 230 of switching valve SW and relief valve RV2 to cause switching valve SW to shift back to its initial position. The cycle then repeats until the load has been fully conveyed. During the return stroke portion of the cycle, correct sequential movement of the motors is ensued by the abutments 164, 164', as well as by the blocking of return connections.

The drive and control system operates in a similar manner to convey a load in the load-direction, i.e. the direction opposite the unload arrow in FIG. 28. Preparatory to a load operation, an operator switches directional control valve DCV into its second position. In this position, path 240 is open and path 242 is blocked. Port 238 is connected to pressure, and port 236 is connected to return. The connection of port 238 to pressure pilots open the load check valves L1–L3. Connection of port 236 to return connects the pilot lines of valves U1–U6 to return to cause these valves to be unidirectional. At the start of a cycle, all of the motors M1–M14 are in their fully retracted positions in which the end clamps 162 hold open the push valves 246, 274. The switching valve SW is in its second position in which outlet port 228 is connected to pressure and outlet port 229 is connected to return.

The connection of switching valve port 228 to pressure connects working chamber 192 of each of the motors M1–M14 to pressure via check valves L3, U3, U6, as described above. To permit the motors M1–M14 to move simultaneously in the load direction, each of the working chambers 193 is connected to return. Working chamber 193 of motor M6 is connected to return via its bypass passageway 252, conduit 254, check valve L1, conduit 247, and switching valve port 229. Similarly, working chamber 193 of motor M9 is connected to return via its bypass passageway 252, check valve L2, conduit 247, and port 229. Return pressure in working chambers 193 of motors M1–M5 and M14–M10 cracks open their pull valves 244 to connect the working chambers 193 to return via check valves L1, L2. Working chamber 193 of motor M7 is connected to return through its bypass passageway 262 and pathway 240 in valve DCV. Pathway 240 also connects working chamber 193 in motor M8 to return via motor M8's return pressure opened pull valve 244. The connections to return in the "C" group, motors M6, M7, M9, is relatively unrestricted. The arrangement of the steps on end clamps 164, 164' prevents these three motors from moving faster than the others to ensure simultaneous movement of the motors M1–M14.

As the motors M1–M14 approach their end of stroke, their pull valves 244, 256 are mechanically opened to permit shifting of the switching valve SW. This connects the working chambers 193 of the motors M1–M14 to pressure via switching valve port 229, as described above. Working chambers 193 of motors M7, M8 are also connected to pressure via path 240 in valve DCV and bypass passageway 262 in motor M7 and open pull valve 244 in motor M8, respectively. Return movement of motors M1–M6, M8–M14 is prevented by blocking of the working chambers 192 of these motors by closed valves U2, U3, U5, U6 and the closed push valve 246 on motor M7. The working chamber 192 of motor M7 is connected to return via switching valve port 228 and check valve L3. Motor M7 moves by itself to its starting position. As it nears the end of its return stroke, its push valve 246 is mechanically opened to connect working chamber 192 of motor M8 to return. Motor M8 then moves by itself and returns to its starting position. The completion of the stroke of motor M8 opens its push valve 246 to connect working chambers 192 of motors M6 and M9 to return to allow motors M6 and M9 to move together back to their starting position. In the same manner, motors M5–M1 and M10–M14 return to their starting position two at a time. Motors M1, M14 are the last to move. The completion of the return stroke of motors M1, M14 opens their push valves 274 to cause the switching valve SW to shift. Thereafter, the cycle is repeated until the load has reached a desired position.

It should be noted that throughout the load sequence of operation, pull valves 256 on motors M6, M9, check valve 258, and the pilot line of check valve U7 remain blocked by the blocking of pathway 242 in valve DCV. Throughout the cycle, the operation of check valve U7 is unidirectional, permitting connection of working chamber 193 in motor M8 to pressure via the valve chamber of its pull valve 244, but preventing connection of working chamber 193 to return via this route. During an unload operation, check valve 258 allows bleed off from valve U7 to permit valve U7 to close at the completion of the simultaneous movement of motors M1–M14.

Figure 28B:
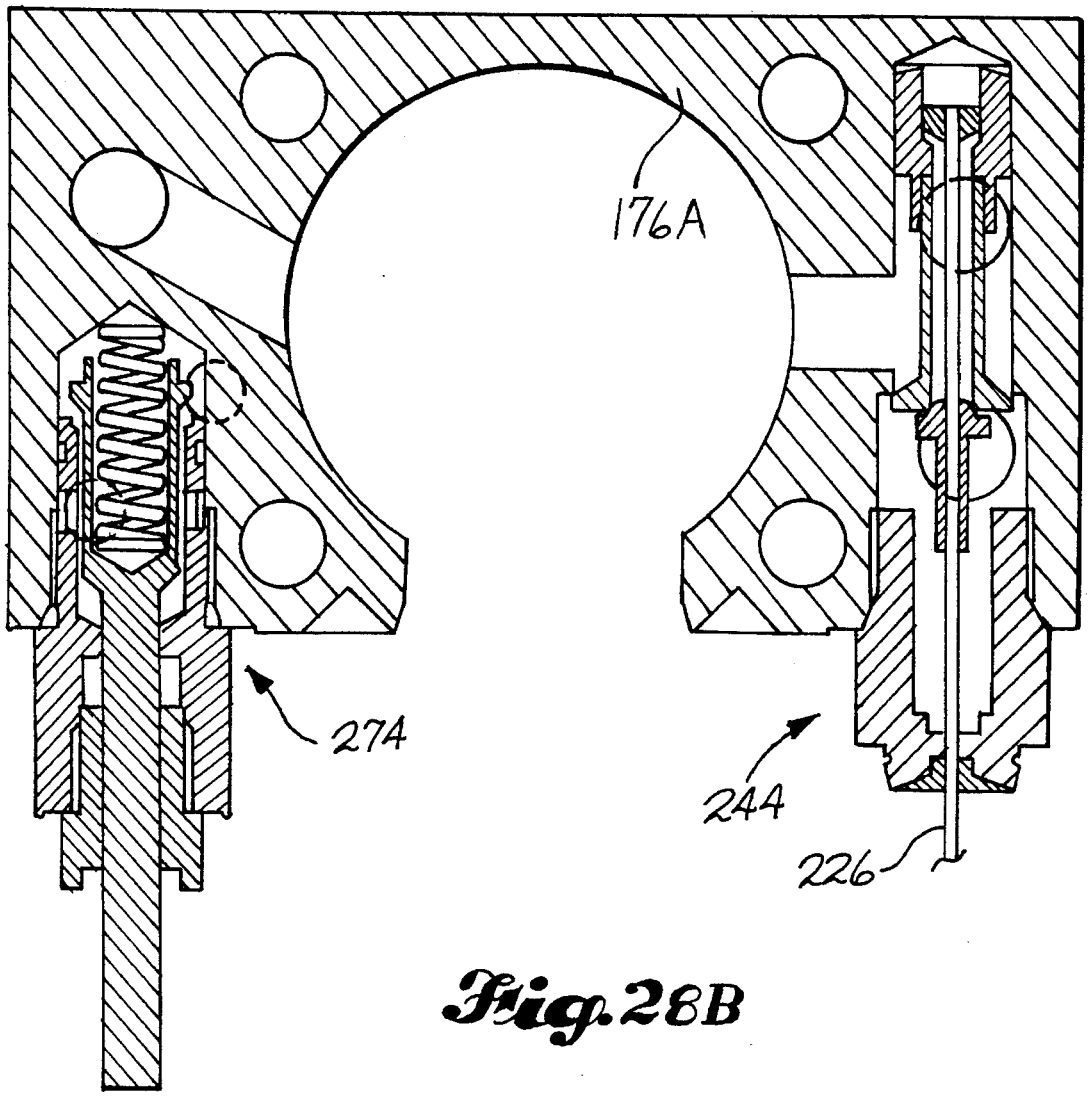
FIGS. 28B and 28C are enlarged sectional views showing the push, pull check valves of FIG. 28.
Figure 28C:
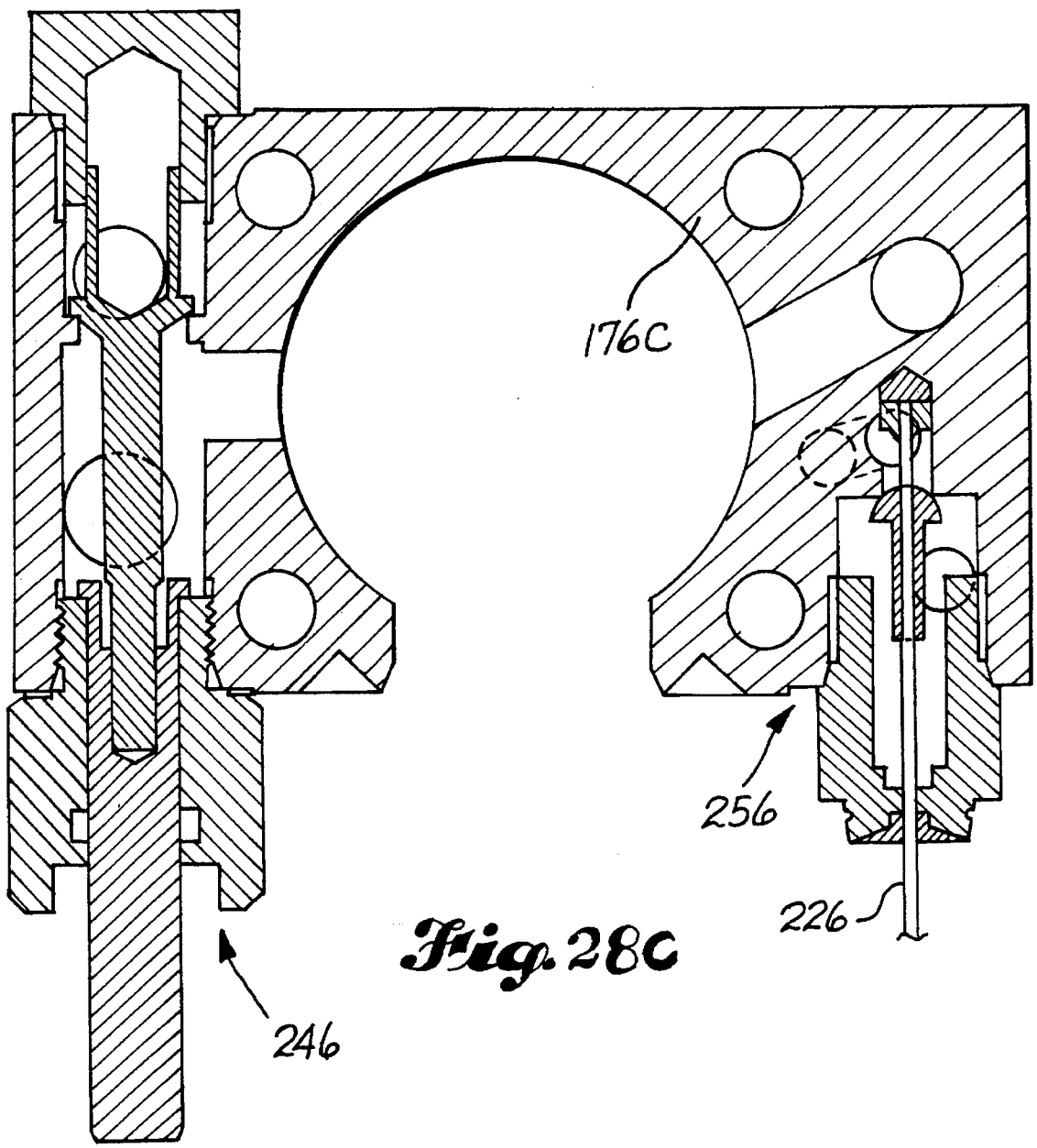
Figure 28D:
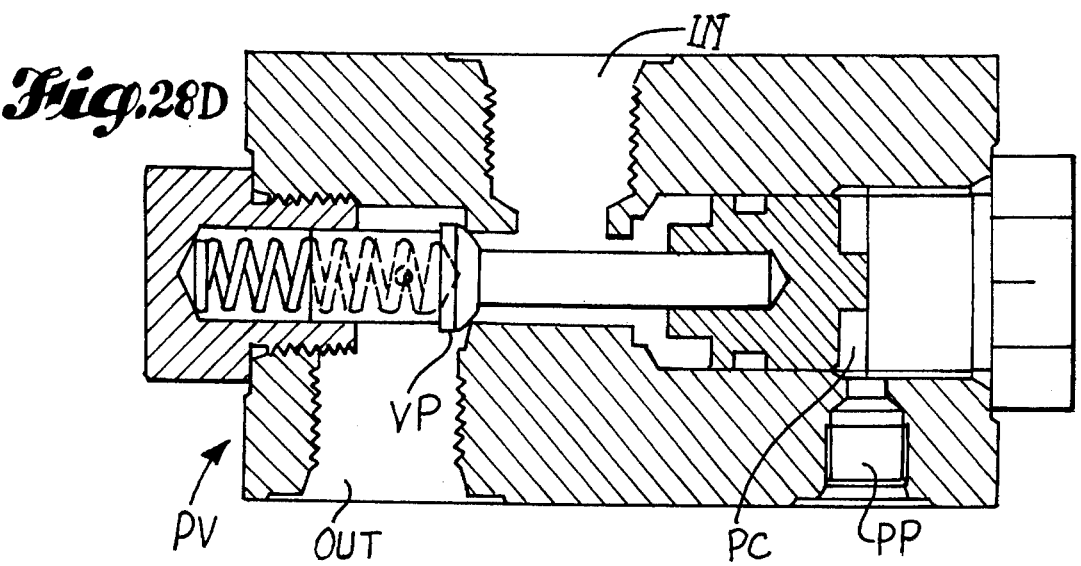
FIGS. 28D, 28E, and 28F are enlarged sectional views of the piloted check valve of FIG. 28 in three different positions.
Figure 28E:
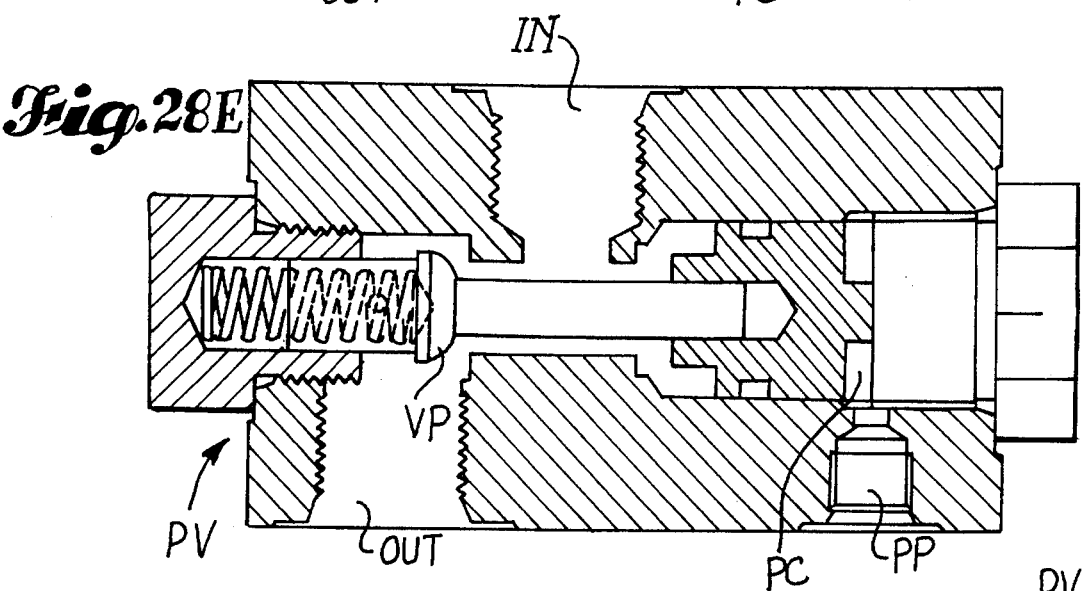
Figure 28F:
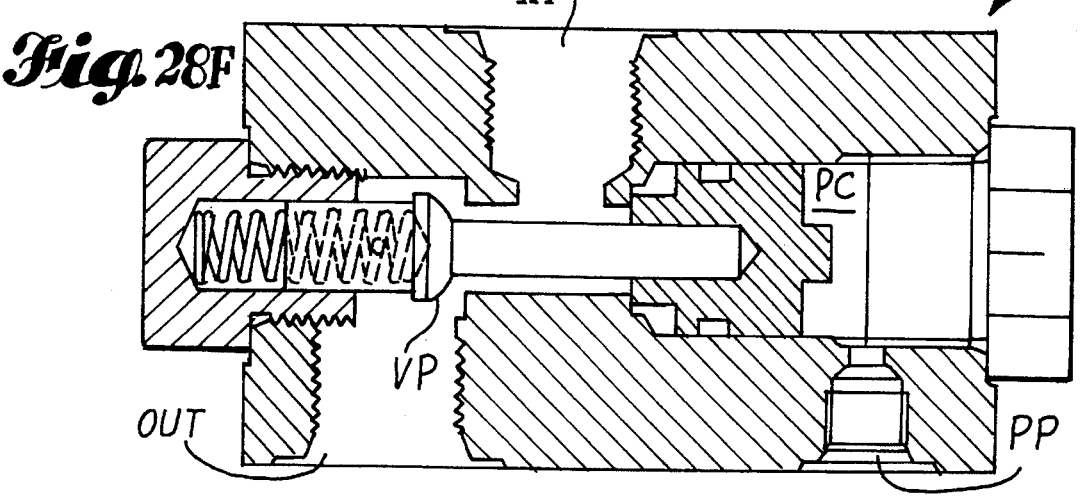

FIGS. 28B, 28C and 29–31 illustrate the currently preferred embodiments of the push and pull valves associated with the motors M1–M14. FIGS. 28B and 29 show the pull valve 244 and push valve 274 of the "A" motors M1, M14. The pull valve 244 preferably has the structure disclosed in my U.S. Pat. No. 5,255,712, granted Oct. 26, 1993, and entitled "Check Valve Pull Assembly." FIG. 30 shows the pull valve 244 and push valve 246 of the "B" motors M2–M5, M8, M10–M13. FIGS. 28C and 31 show the pull valve 256 and push valve 246 of the "C" motors M6, M7, M9. The lower housing portions of the ball blocks are designated 176A, 176B, 176C, respectively, in FIGS. 29–31 to reflect the modifications of the ball block housing portions that must be provided to accommodate the differences in the pull and push valves. The illustrated valve structures are currently preferred, but the structures may be varied without departing from the spirit and scope of the invention.

Figure 16:
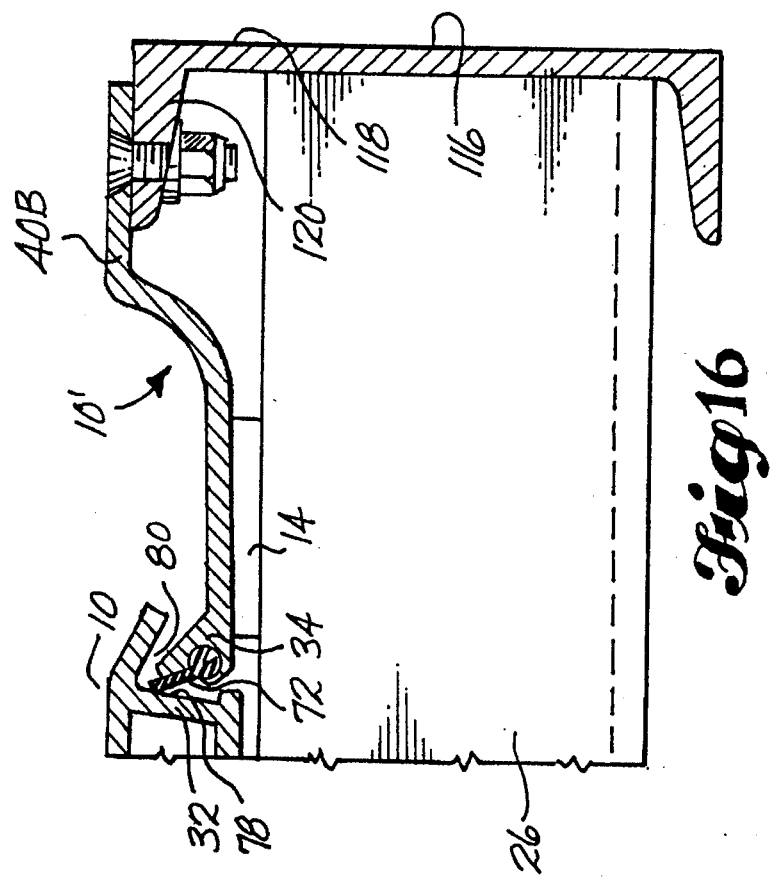
FIG. 16 is a fragmentary sectional view taken substantially at circle 16 in FIG. 3, such view showing a fixed floor slat member attached to the other side of the conveyor floor frame.
Figure 15:
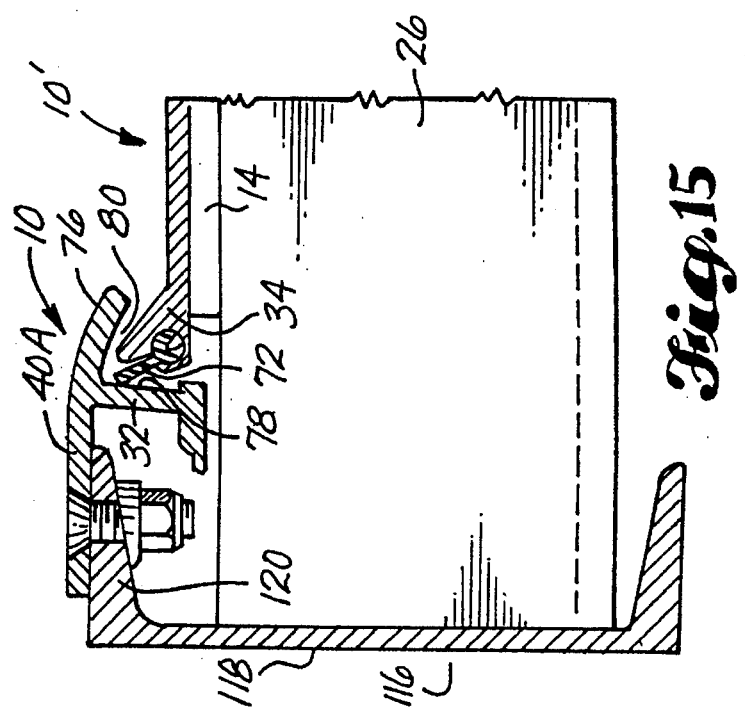
FIG. 15 is a fragmentary sectional view taken substantially at circle 15 in FIG. 3, such view showing a fixed floor slat member attached to one side of the conveyor floor frame.

In a typical installation of the first preferred embodiment, approximately fourteen side-by-side floor slat members 10, 10' are placed in and form the floor of a material container 116, as shown in FIG. 3. Container 116 may be part of a stationary installation or may be a rail car, a truck box, a trailer box, or a cargo container. Referring to FIGS. 15–16, floor slat members 10 attach to a sidewall 118 of container 116 via a flange 120. The top panel 40 of a floor slat member is cut to form a partial top panel 40A. Partial top panel 40A mounts on flange 120 and is bolted together at the left side of container 116. Partial top panel 40A is cut to remove the I-beam region 60, as depicted in FIG. 15. Referring to the right side of container 116, as shown in FIG. 16, another partial top panel 40B is nearly the mate to partial top panel 40A. Flange 120 is attached to sidewall 118, preferably by a weld.

FIG. 17 shows a floor slat member that is an alternative embodiment of the floor slat in the first preferred embodiment of the invention. This embodiment was originally disclosed in my aforementioned U.S. Pat. No. 5,415,271. The floor slat member shown in FIG. 17 has laterally spaced-apart first and second sidewalls 122, 124 with a top panel 126 connecting the two sidewalls. Extending longitudinally of the top panel 126 are two leg portions 128, 130 that are laterally spaced apart and in between the first and second sidewalls 122, 124. The floor slat member snaps over two slide bearings 12, which is the same bearing used for floor slat member 10, as shown in FIG. 5. First sidewall 122 includes a narrow channel 132 to hold a lower second elastomeric elongated seal strip member 134. Second elongated seat strip member 134 contacts a seal member receiving surface 136 on second sidewall 124 of an adjacent floor member.

Resting on top portion 126 is an upwardly-opening overlay channel having a bottom panel 138. An upwardly extending first wall 140 extends from one end of bottom panel 138, and an upwardly and outwardly extending second wall 142 extends from the other end of the bottom panel 138. Extending outwardly and downwardly from first wall 140 is a side flange 144 that overhangs second wall 142 of an adjacent overlay channel of an adjacent floor member. Overlay channel 138 is attached to top portion 126 of the floor slat member via a bolt 145, although other attachment methods may be used.

Side flange 144 overhangs second wall 142 to form a narrow gap 146. Abrasive debris/particulates 147 resting in the overlay channel forms an angle of repose 148 between side flange 144 and second wall 142. An elastomeric overlay seal 150 (better depicted in FIGS. 18 and 19), having two legs 152, 154, spans gap 146 and confronts side flange 144 and second wall 142 in a wishbone-like design, restraining debris/particulates 147 from entering an open area 156 underneath second wall 142, side flange 144 and first wall 140. Area 156 is directly overhead a gap 158 between adjacent floor members. Second elongated seal strip member 134 spans gap 158 to confront second sidewall 124. Overlay seal 150, therefore, protects second seal member 134 and gap 158 from abrasive debris, and also the hydraulic drive unit members below the floor member, not shown. Overlay seal 150 also has a curved tail end 160 which covers an end 162 of second wall 142 to further protect the floor slat member from debris/particulates 147 and friction during back and forth movement.

Another feature of the integral one-piece floor member as depicted in FIGS. 1–3 and 5–8 is that debris and liquids collect in the bottom panel 46, as inferred from FIG. 6. As floor slat members 10 move, liquid is channeled and removed out the end of the container.

The second preferred embodiment of the invention is shown in FIGS. 32–39. In this embodiment, motor M' has essentially the same structure as the motor M shown in FIGS. 9–14, 20–22, 25–28, and 29–31. Both motors M, M' have a cylinder component 92, a piston component 90, a cylinder plug 97, and a tubular extension 102 supported by a slide bearing 104. However, there are significant differences between the other portions of the conveyor shown in FIGS. 32–39 and the corresponding portions of the first preferred embodiment.

Most notably, in the second preferred embodiment, there are a relatively small number of motors M' (preferably three) mounted on a compact, lightweight frame 302. The frame 302 includes a pair of longitudinally-spaced transverse mounting members 304, 306 connected by two laterally-spaced longitudinal frame members 308. The four frame members 304, 306, 308 define a rectangular window in which the motors M' are mounted. The first transverse mounting member 304 is a C-shaped channel beam with opposite horizontal flanges 310 connected by a web 312. The flanges 310 extend from the web 312 away from the second transverse mounting member 306. The slide bearings 104 are secured to the web 312 of the first transverse mounting member 304 so that the tubular extensions 102 are supported and vertically restrained by the mounting member 304. The ball end 98 of the piston component 90 of each motor M' is received in a ball block 100 that is secured to the second transverse mounting member 306. This positions each of the motors M' between the opposite transverse mounting members 304, 306, except that the ball end 98 overlaps the member 306 and the outer end of the tubular extension 102 projects through the mounting member 304. The motors M' are also positioned between the longitudinal frame members 308 to position them in the window defined by the frame 302.

Figure 33:
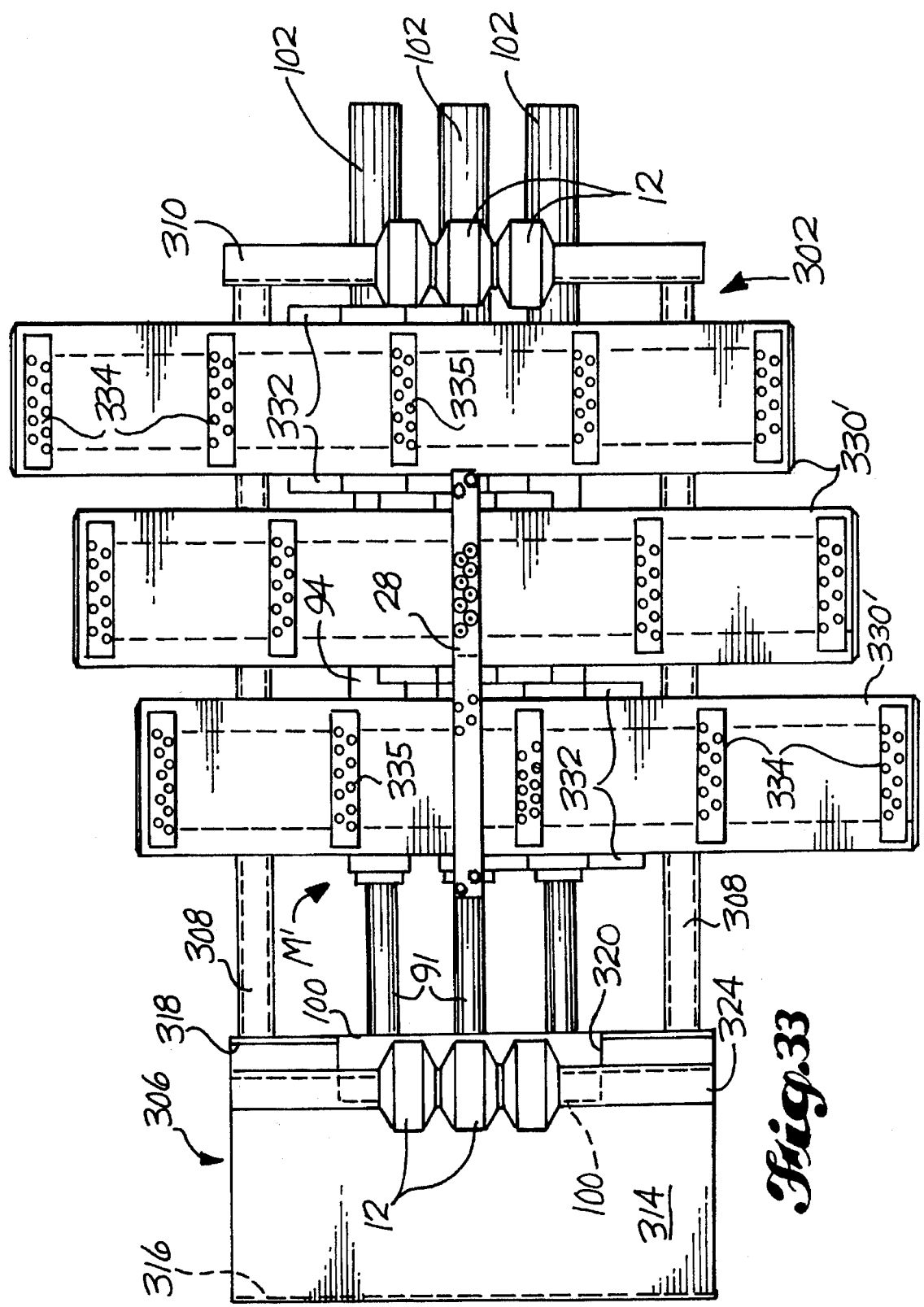
FIG. 33 is a top plan view of FIG. 32 and depicting the slide bearings of FIGS. 1, 2, 5–6.

Each of the transverse mounting members 304, 306 forms a structural beam and is secured to the framework of a structure in which the conveyor is installed to transmit conveyor operational loads to the framework. Referring to FIGS. 32–34, transverse mounting member 306 includes a horizontal plate 314 with opposite laterally extending flanges 316, 318. The outer flange 316 extends downwardly from the outer edge of the plate 314. The inner flange extends both upwardly and downwardly from the inner edge of the plate 314. A center cutout 320 is provided in the plate 314 and inner flange 318 to receive the ball blocks 100. A manifold 101 is secured to the back surfaces of the lower housing portions of the ball blocks 100 to connect the ball ends 98 to hydraulic pressure and return through the ball blocks 100. A laterally extending diagonal plate 322 is angled downwardly and outwardly from the top of the ball blocks 100 to the plate 314 and provides a bracing gusset to reinforce the connection of the motors M' to the transverse mounting member 306. An upside down L-shaped member 324 is positioned longitudinally between inner flange 318 and brace 322 and extends laterally along the top of plate 314 and the tops of the ball blocks 100 from one lateral edge of the plate 314 to the opposite lateral edge. The member 324 extends vertically upwardly from the plate 314 and ball blocks 100 and then horizontally outwardly toward the outer flange 316.

The upper horizontal leg of the member 324 supports and is secured to a plurality of longitudinal guide beams 28. The upper horizontal flange 310 of the transverse mounting member 304 also supports and is secured to a plurality of longitudinal guide beams 28 that are aligned with the guide beams 28 on the L-shaped member 324. Bearings 12 are positioned on the guide beams 28 to slidably support the floor slat members of the conveyor. The configurations of the bearings 12 and floor slat members are not a part of the present invention. They may be like those shown in FIGS. 1–9 or 17–19. They also may be like various known bearing and slat member configurations.

Referring to FIGS. 32–34, a plurality of longitudinally spaced transverse drive beams 330, 330' are mounted on and above the motors M', one drive beam for each motor M'. During operation of the conveyor, the drive beams 330, 330' travel longitudinally between the transverse mounting members 304, 306. The drive beams may be like those disclosed in my U.S. Pat. No. 5,193,661, granted Mar. 16, 1993, and entitled "System of Linear Hydraulic Motors," or my U.S. Pat. No. Reissue 35,022, reissued Aug. 22, 1995, and entitled "Reduced Size Drive/Frame Assembly for a Reciprocating Floor Conveyor." The latter type of drive beam 330 is shown in FIG. 34. The drive beams may be modified to have a C-shaped cross section, like the drive beams 330' shown in FIGS. 32 and 33. Whatever the configuration of the drive beams, the frame 302, motors M', and drive beams 330, 330' form a compact lightweight drive assembly that may be easily installed in a structure.

The drive assembly includes connectors that secure the drive beams 330, 330' to the motors M'. In preferred form, the connectors comprise two clamps 332 for each drive beam 330, 330'. The clamps may be like those disclosed in my aforementioned U.S. Pat. No. Reissue 35,022 or in my U.S. Pat. No. 5,433,312, granted Jul. 18, 1995, and entitled "Drive Assembly for Conveyor Slats of Reciprocating Floor Conveyor." The clamps 332 preferably are like those shown in the reissue patent. Referring to FIGS. 32 and 34, each clamp 332 has an upper part that is attached to the respective drive beam 330, 330' and is bolted to a lower clamp part that cradles the movable cylinder component of the motor M'. The arrangement of the clamps is shown in FIGS. 32–34. For a first one of the drive beams 330, 330', both clamps 332 connect the drive beam 330, 330' to the cylinder barrel 94 of the cylinder component 92 of the respective motor M'. A second drive beam 330, 332 is attached to its motor M' by clamps 332 that engage the cylinder barrel 94 and tubular extension 102, respectively. For the third drive beam 330, 330', both clamps 332 engage the tubular extension 102.

This arrangement makes use of substantially the full length of the cylinder component 92. The tubular extension 102 performs a plurality of functions. It provides a means for restraining the end of the motor M' opposite the ball end 98. It also serves as a mount for one of the drive beams 330, 330' and a portion of another drive beam 330, 330'.

The drive beams 330, 330' perform the known function of transmitting longitudinal movement of each motor M' to a set of floor slats. The floor slats are divided into sets and groups, with one set of floor slats for each motor M' and its transverse drive beam 330, 330'. Each group of floor slats includes a plurality of adjacent floor slats, three in the embodiment shown in FIGS. 32–34, one floor slat from each set of floor slats. The slats in each set are connected to their respective drive beams 330, 330' above the motors M' by means of connectors. FIGS. 33 and 34 show an example of a suitable type of connector 334. There is one connector 334 for each floor slat. The connector 334 is attached to its drive beam 330, 330' and floor slat by suitable means, such as by welding or by a plurality of fasteners 335, shown in FIG. 33.

Referring to FIGS. 32, 34, and 35, the slide bearing 104 has the same structure as in the first embodiment. However, the bearing 104 is mounted in a vertical orientation, rather than in the horizontal orientation shown in FIGS. 22 and 23. In the second embodiment, the opposite flanges 187 of the annular bearing housing 185 extend upwardly and downwardly, respectively, instead of in the opposite lateral directions shown in FIG. 22. The flanges 187 are secured to the web 312 of the transverse mounting member 304 by means of bolts 103. A circular opening 336 extends through the web 312 and is aligned with the axial opening through the bearing 104 to receive the tubular extension 102 therethrough, as best seen in FIG. 35.

In both of the illustrated embodiments, the vertical distance d, d' between the longitudinal centerline of the motor M, M' and the floor slat is kept to a minimum in order to help minimize operational loads on the frame 302 and ensure smooth operation of the conveyor. Referring to FIGS. 11 and 22, the distance d between the top of the floor slat member 10 and the centerline of the motor M is maintained at a minimum by the horizontal orientation of the bearing 104 and the dimensioning of the tubular extension 102 to have a diameter slightly smaller than the diameter of the cylinder barrel 94. Referring to FIG. 34, the vertical distance d' between the top of the guide beam 28 and the longitudinal centerline of the motor M' is necessarily larger, for a given diameter motor, than the vertical distance d shown in FIG. 11 because of the presence of the transverse drive beams 330, 330' between the floor slats and the motor M' However, the distance d' is still relatively short. For example, in the illustrated embodiment, the distance d' is approximately four and three-quarter inches. The vertical distance between the centerline and the top of a floor slat member (not shown in FIG. 34) would be slightly larger.

The motors M' in the second embodiment have substantially the same structure as the motor M shown in FIGS. 9–14, 20–22, 25–28, and 29–31. The main difference between motors M and the motors M' is in the type of check valves that are associated with the motors. In the second embodiment, a first motor M'-1 has a single check valve in the form of an external pull valve 244 like the pull valve 244 associated with motors M1–M5, M8, and M10–M14 of the first embodiment. A second motor M'-2 also has a pull valve 244 and, in addition, has an internal check valve 338 but no external push valve. The third motor M'-3 has a single check valve in the form of an internal check valve 338. The two external pull valves preferably have the structure disclosed in my U.S. Pat. No. 5,255,712.

The internal check valves 338 have the type of structure disclosed in my aforementioned U.S. Pat. No. 5,427,229. The structure is modified by substituting a secondary valve plug 340 with a stem 342 for the ball valve element shown in the patent. In addition, there are three biasing springs 344 to provide more biasing force. Each of the springs 344 engages the secondary valve plug 340. The structure of the internal check valve 338 is best seen in FIGS. 36, 37. Its operation is essentially the same as the operation of the check valve disclosed in U.S. Pat. No. 5,427,229. The valve 338 is biased closed by the springs 344. It may be opened by pressure or by a mechanical push exerted by wire rod 339. FIG. 36 shows both the secondary valve plug 340 and the main valve element 346 in their seated positions. FIG. 37 shows both valve elements 340, 346 in their unseated positions.

Figure 38:
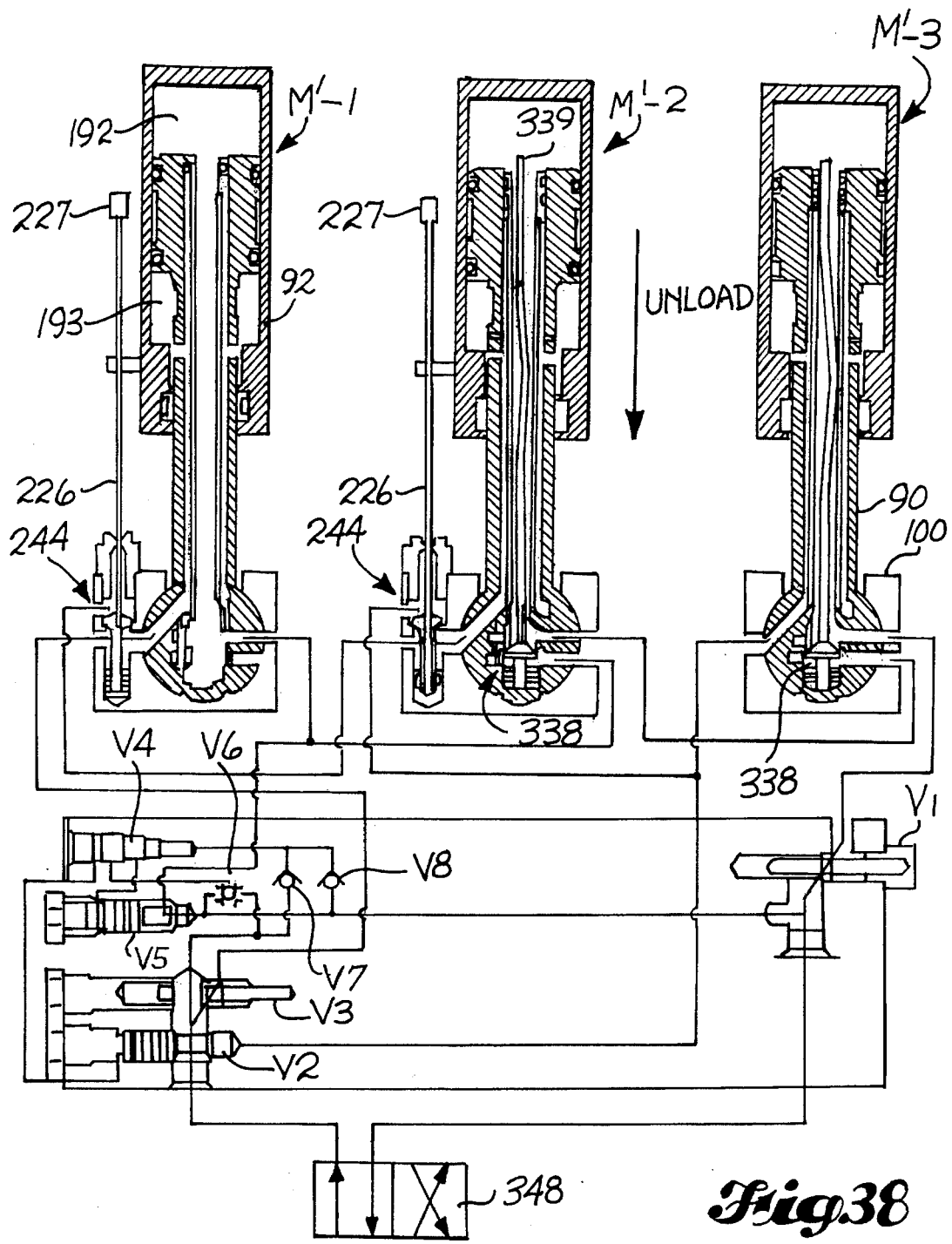
FIG. 38 is a schematic view of a first embodiment of the control system for the drive units of FIGS. 32–37.
Figure 39:
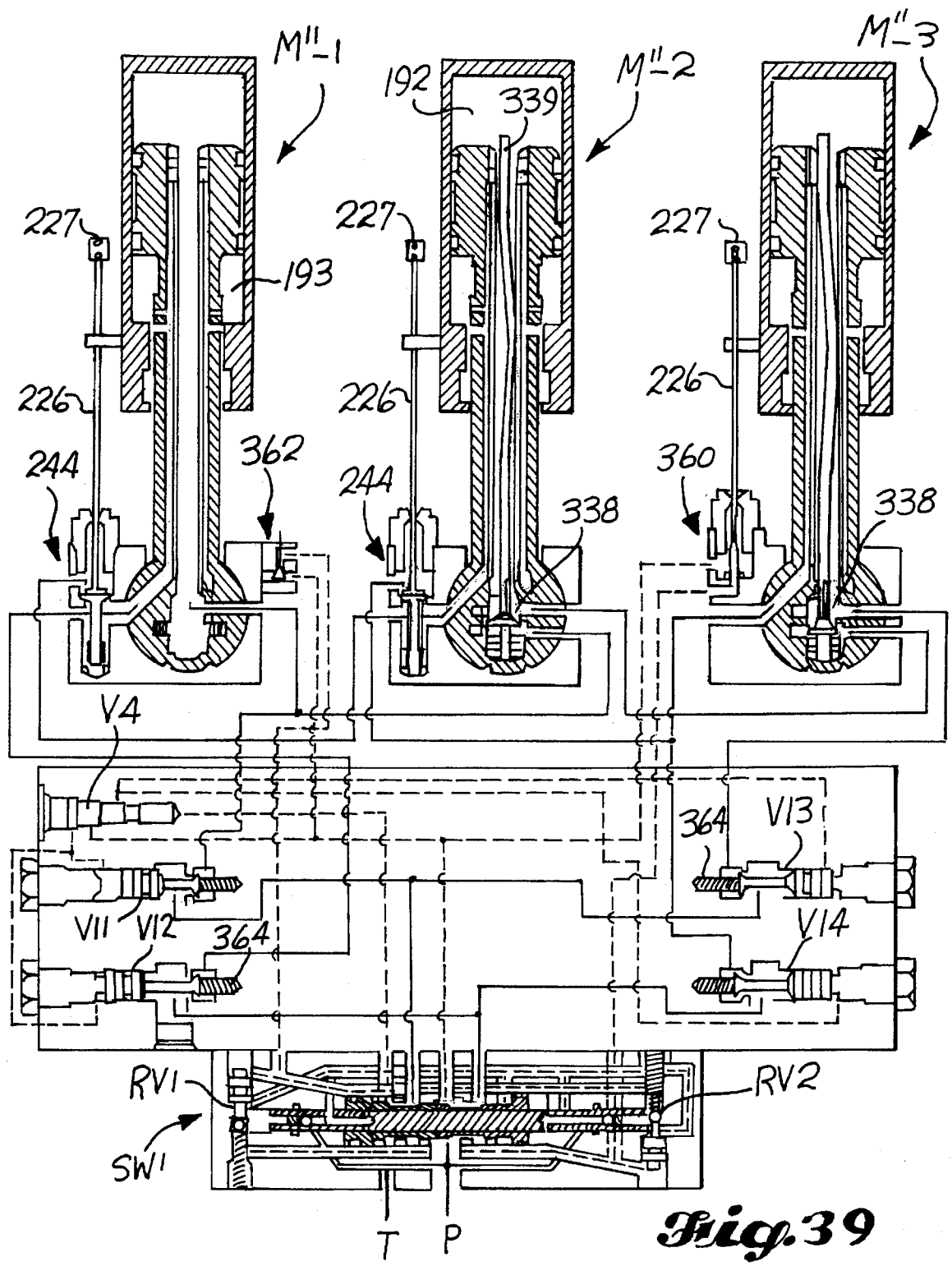
FIG. 39 is a schematic view of an alternate control system for the drive units of FIGS. 32–37.

FIGS. 38 and 39 illustrate two alternative control systems for use in the second preferred embodiment of the conveyor. Each of the two control systems moves the conveyor slats in the manner described in my aforementioned U.S. Pat. No. 5,165,524. A load may be conveyed in either of two opposite longitudinal directions. During a conveying operation, the motors are moved simultaneously in the conveying direction to convey the load. Then, the motors are returned to their starting positions, one at a time. After all three motors have returned to their starting positions, the operation is repeated until the load has reached its desired position.

The control system shown in FIG. 38 has similar elements and operates in a very similar manner to the control system disclosed in my aforementioned U.S. Pat. No. 5,427,229. Therefore, the control system elements and operation will only be briefly described herein. Referring to FIG. 38, the system includes a switching valve 348 and a plurality of other valves V1–V8, each of which has a structure and a function similar to that of a corresponding element in the system disclosed in U.S. Pat. No. 5,427,229. The switching valve 348 has a two-position control rod that is mechanically shifted by engagement of abutments carried by the control rod with abutments carried by the transverse drive beams 330, 330'.

Figure 38A:
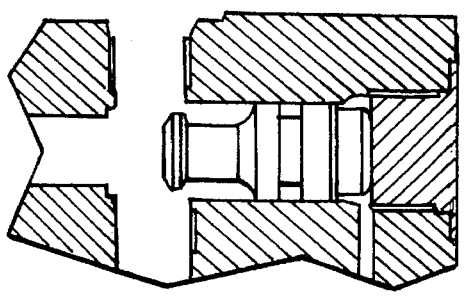
FIGS. 38A and 38B are enlarged sectional views illustrating the pilot operated check valve of FIG. 38.
Figure 38B:
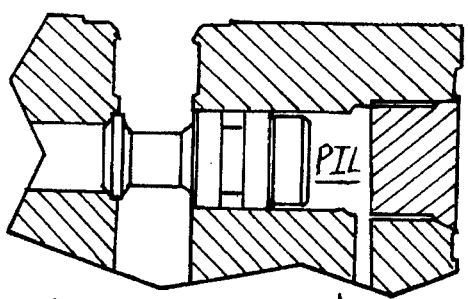

The conveying direction is determined by a four-way, two-position directional control valve V4 that is manually operated and has the structure disclosed in my U.S. Pat. No. 5,427,229. The directional control valve V4 has a pressure port, a return port, and two outlet ports that communicate with the pilot chambers PIL of two pilot operated check valves V2, V5. The structure of valve V2 is shown in more detail in FIGS. 38A and 38B. The structure of valve V5 is the same except that one of the opposite radial ports is blocked. In the patent, the pilot operated valves are referred to as the "unload control valve" and the "load control valve". During a load operation, the pilot chamber PIL of the unload control valve V2 is connected to return and the pilot chamber PIL of the load control valve V5 is connected to pressure to maintain valve V5 closed and to permit valve V2 to remain open. During an unload operation, the connections to the valves V2, V5 are reversed. FIGS. 38A and 38B illustrate the open and closed positions, respectively, of valve V2. Valve V6 is a shuttle valve that maintains the pressure port of valve V4 in communication with the pressure source regardless of the position of the switching valve 348. Valves V7, V8 are check valves that allow return flow from the return port of valve V4 but prevent pressure from being communicated to the return port.

Figure 38C:
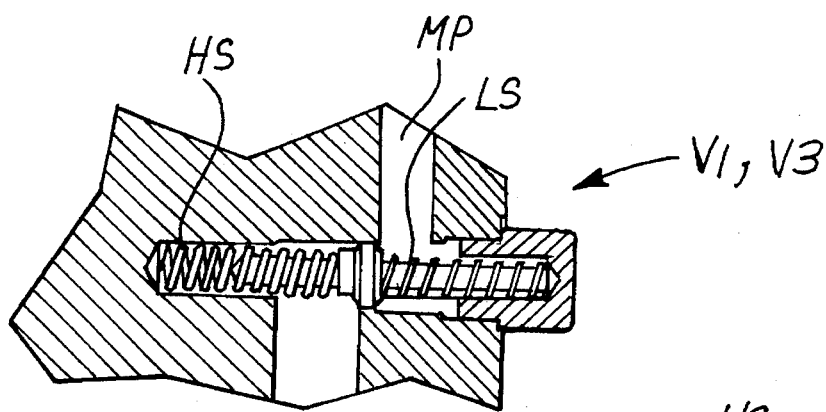
FIGS. 38C, 38D, and 38E are enlarged sectional views illustrating the restrictor valve of FIG. 38.
Figure 38D:
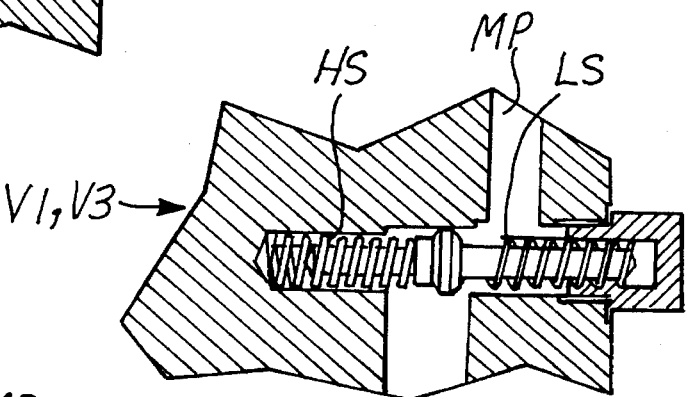
Figure 38E:
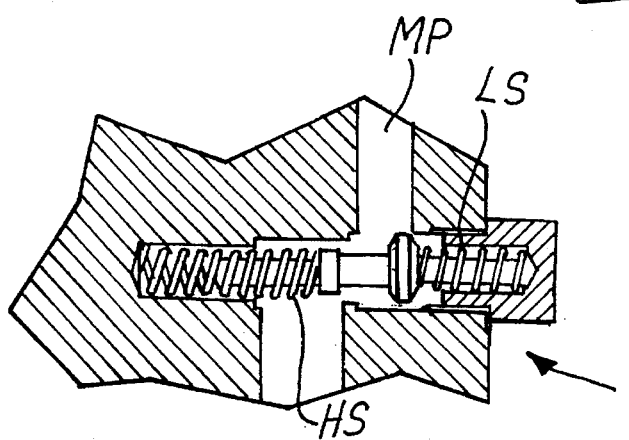

Valves V1, V3 are restrictor valves that help ensure simultaneous movement of the motors M'-1, M'-2, M'-3 during movement in the conveying direction. Valve V1 works in an unload operation to restrict return flow from working chamber 192 of motor M'-3. Return flow from motor M'-2 is restricted by the internal check valve 338 in motor M'-3, which is opened by return pressure in motor M'-3. Similarly, return flow from motor M'-1 is restricted by the internal check valves 338 in each of the other two motors M'-2, M'-3. Restrictor valve V3 operates in a similar manner in a load operation to restrict return flow from working chamber 193 of motor M'-1. Restriction of return flow from the other motors M'-2, M'-3 is provided by the pull valves 244. The valves V1, V3 have the structure and function in the manner disclosed in my U.S. Pat. No. 5,427,229. FIGS. 38C, 38D, and 38E show the valve in a neutral position, a restrictor position, and a free return position, respectively. In the free return position, pressure flows freely through the valve V1, V3 and out its port MP to a motor M'. The combination of a heavy spring HS and a light spring LS provides the desired one-way restriction.

FIG. 39 shows a second control system for the second preferred embodiment of the invention. Currently, the control system of FIG. 39 is preferred over that of FIG. 38. In the system shown in FIG. 39, the mechanically operated switching valve 348 of the system shown in FIG. 38 is replaced by a pilot-operated switching valve SW'. This switching valve is preferably the same as that shown in FIGS. 28 and 28A and described in connection with the first embodiment of the invention, except that passageways from pressure P and return T to the pressure and return ports of valve V4 are provided through valve SW'. In order to facilitate understanding of the control system, in FIG. 39, pilot lines are shown as broken lines, and lines connecting to the working chambers 192, 193 of the motors are represented by solid lines.

Referring to FIG. 39, the motors are modified in that they are provided with additional external valves. As in the system shown in FIG. 38, motors M"-1 and M"-2 each have an external pull valve 244. Motors M"-2 and M"-3 each have an internal check valve 338. The additional valves not present in the system of FIG. 38 are a pull valve 360 on motor M"-3 and a push valve 362 on motor M"-1. These valves 360, 362 control the pilot lines to switching valve SW' in the manner described above in reference to FIGS. 28 and 28A. The valves 360, 362 preferably have the same structure as valves 256, 274, shown in FIGS. 28, 28B, and 28C.

Figure 39C:
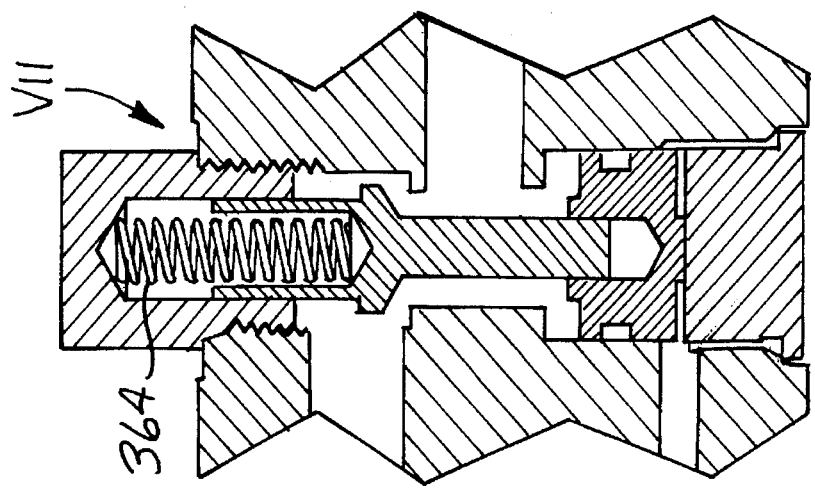
FIGS. 39A, 39B, and 39C are enlarged sectional views illustrating the pilot-operated control valve of FIG. 39.
Figure 39B:
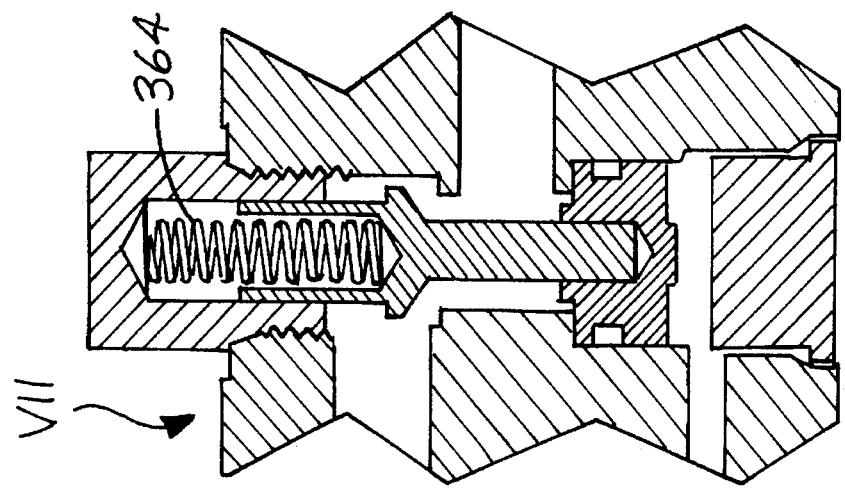
Figure 39A:
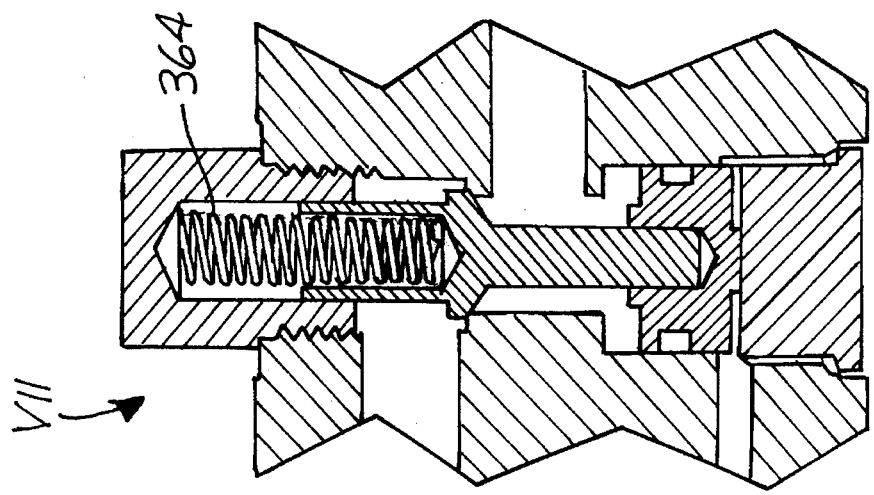

Still referring to FIG. 39, the control system also includes a four-way, two-position directional control valve V4 of the same type shown in FIG. 38. There are no restrictor valves in the system of FIG. 39. There are four pilot-operated control valves V11, V12, V13, V14. These four valves all have the same structure and are similar to the control valves V2, V5 of FIG. 38. However, unlike valves V2, V5, which are held closed by pilot pressure, valves V11–V14 are held open by pilot pressure. During an unload operation to convey a load in the direction indicated by the arrow in FIG. 38, valves V11 and V12 are held open by pilot pressure and valves V13 and V14 have their pilot chambers connected to return and are biased closed by springs 364. The open and closed positions of the valves are reversed during a load operation. FIGS. 39A, 39B, and 39C show valve V11 in a closed position, a piloted open position, and an open position, respectively.

In operation of the system to convey a load in the unload direction, pressure is supplied to the working chambers 193 of the motors through open valve V12 to move all three motors M"-1, M"-2, M"-3 simultaneously in the unload direction. Pressure is communicated from valve V12 through the valve chamber of pull valve 244 on motor M"-1 into working chamber 193 of motor M"-1. The pressure in the valve chamber also opens the pull valve 244 so that pressure is supplied through the opened valve 244 and a conduit into motor M"-2 through the valve chamber of its pull valve 244. Pressure is similarly communicated to motor M"-3 from motor M"-2. The connection of motor M"-3 to return via valve V13 is blocked by the closing of valve V13. Therefore, the connection to return must be made through the internal check valve 338 of motor M"-3, which is opened by return pressure, through return pressure opened internal check valve 338 in motor M"-2, and then through pilot pressure opened valve V11. The connection to return of motor M"-1 is unrestricted. However, the transverse drive beams of the system have abutments, similar to those shown in FIG. 28, which prevent motor M"-1 from moving prior to motors M"-2, M"-3 and motor M"-2 from moving prior to motor M"-3. Thus, all three motors move simultaneously away from their start positions in the unload direction. On the return stroke, motor M"-1 is supplied with pressure through open valve V11. The connection to return is provided through open valve V12. Movement of the other two motors is blocked by the closing of the pull valves 244. At the end of the return stroke of motor M"-1 back to its start position, the pull valve 244 of that motor is opened to provide a connection to return for motor M"-2. Motor M"-3 is similarly connected to return by the completion of the stroke of motor M"-2.

The operation of the system to convey in the load direction is basically the reverse of the unload operation. In both load and unload modes of operation, valves V12 and V14 provide sequencing of movement of the motors in the forward direction, i.e. in the load direction. Valves V11 and V13 provide sequencing of movement in the rearward direction.

All of my prior patents mentioned in this application, and my co-pending application, Ser. No. 08/390,759 are hereby incorporated into this application by this reference.

It is to be understood that many variations in size, shape, and construction can be made to the illustrated and above-described embodiments without departing from the spirit and scope of the present invention. Some of the features of the preferred embodiments may be utilized without other features. Therefore, it is to be understood that the presently described and illustrated embodiments are non-limitive and are for illustration only. Instead, my patent is to be limited for this invention only by the following claim or claims interpreted according to accepted doctrines of claim interpretation, including the doctrine of equivalents.

What is claimed is:

1. In a reciprocating floor conveyor of a type having a plurality of elongated floor slat members mounted adjacent each other for longitudinal reciprocation, a drive unit for reciprocating at least one of said floor slat members, said drive unit comprising:

a longitudinally fixed piston component having an outer end portion mounted on a fixed support and an inner end portion, said inner end portion including a piston head, and said piston component including a piston rod extending outwardly from said piston head;

a cylinder component including a cylinder barrel mounted to travel on said piston head, said cylinder barrel having a first end through which said piston rod extends and a second closed end;

an axially-extending tubular extension attached to said second end to travel with said cylinder barrel; and a fixed tubular slide bearing having an axial opening through which said tubular extension extends;

wherein said bearing supports and guides said tubular extension to aid alignment of said cylinder barrel.

2. The drive unit of claim 1, in which said outer end portion of said piston component includes a ball end, and which comprises a ball block that defines a socket into which said ball end is received and that is secured to said fixed support to mount said outer end portion thereon.

3. The drive unit of claim 1, in which said second end includes a cylinder plug and said plug is attached to said tubular extension.

4. The drive unit of claim 1, in which said cylinder component is connected to at least one floor slat member.

5. The drive unit of claim 4, which comprises an elongated barrel clamp that is mounted on said cylinder component and attached to said floor slat member to connect said cylinder component to said floor slat member.

6. The drive unit of claim 4, in which said slide bearing, tubular extension, and cylinder component have a common longitudinal axis; and said slide bearing has a relatively small radial thickness to help minimize the vertical distance between said longitudinal axis and said one floor slat member.

7. A reciprocating floor conveyor having a plurality of elongated floor slat members mounted adjacent each other for longitudinal reciprocation, and a plurality of linear hydraulic drive units for selectively reciprocating the floor slat members, each said drive unit comprising:

a longitudinally fixed piston component having an outer end portion mounted on a fixed support and an inner end portion, said inner end portion including a piston head, and said piston component including a piston rod extending outwardly from said piston head;

a cylinder component including a cylinder barrel mounted to travel on said piston head, said cylinder barrel having a first end through which said piston rod extends and a second closed end;

an axially-extending tubular extension attached to said second end to travel with said cylinder barrel; and a fixed tubular slide bearing having an axial opening through which said tubular extension extends;

wherein said bearing supports and guides said tubular extension to aid alignment of said cylinder barrel.

8. The conveyor of claim 7, in which said outer end portion of each said piston component includes a ball end, and which comprises, for each said piston component, a ball block that defines a socket into which said ball end is received and that is secured to said fixed support to mount said outer end portion thereon.

9. The conveyor of claim 7, in which said second end includes a cylinder plug and said plug is attached to said tubular extension.

10. The conveyor of claim 7, in which each said cylinder component is connected to at least one floor slat member.

11. The conveyor of claim 10, in which the cylinder component of each said drive unit and the corresponding slide bearing have a common longitudinal axis, and the slide bearing has a relatively small radial thickness to help minimize the vertical distance between said axis and said one floor slat member.

12. The conveyor of claim 7, in which said floor slat members are arranged in sets and groups, one set for each drive unit, each group including adjacent floor slat members, one from each set; and which further comprises a plurality of longitudinally spaced transverse drive beams, one for each drive unit, each transverse drive beam being connected to the cylinder component of its drive unit and to each of the floor slat members in the set of floor slat members corresponding to said drive unit.

13. The conveyor of claim 12, in which each said transverse drive beam is clamp connected to its drive unit, and at least one of the transverse drive beams is mounted at least partially on the tubular extension of its drive unit.

14. The conveyor of claim 7, comprising first and second abutments carried by and extending in opposite lateral directions from one of said cylinder components and having abutment surfaces facing in opposite longitudinal directions, and an adjacent abutment carried by each of two of said cylinder components adjacent to said one of said cylinder components, said adjacent abutments confronting said first and second abutments to provide simultaneous movement of said cylinder components in one longitudinal direction and sequential retraction in the opposite direction in a predetermined order.

15. The conveyor of claim 7, in which the cylinder component of each said drive unit and the corresponding slide bearing have a common longitudinal axis, and the slide bearing has a relatively small radial thickness to help minimize the vertical distance between said axis and the floor slat members.

16. A reciprocating floor conveyor comprising:

a frame;

a plurality of elongated floor slat members mounted on the frame for longitudinal reciprocation;

a drive unit positioned below said floor slat members, said drive unit including a piston component and a cylinder component, said piston component having an outer end portion connected to said frame, and an inner end portion positioned inside said cylinder component, said cylinder component being connected to at least one floor slat member, said cylinder component having a closed end opposite said piston component;

a tubular slide bearing attached to said frame below said floor slat members adjacent the closed end of said cylinder component; and an elongated tubular member connected at one end to the closed end of the cylinder component to travel with the cylinder component, said tubular member extending endwise outwardly from said cylinder component and slidably through said tubular bearing.

17. The conveyor of claim 16, in which said slide bearing, tubular member, and cylinder component have a common longitudinal axis; and said slide bearing has a relatively small radial thickness to help minimize the vertical distance between said longitudinal axis and said one floor slat member.

18. A drive assembly for a reciprocating slat conveyor, said drive assembly comprising:

a plurality of piston-cylinder drive units, each said drive unit having a longitudinally fixed piston component, a moveable cylinder component, and a tubular extension that is connected to the cylinder component and extends endwise from it in a direction opposite the piston component;

a plurality of transverse drive beams, one for each drive unit, each said drive beam being connectable to a separate set of elongated conveyor slat members;

a first connector connecting one of said drive beams to the cylinder component of its drive unit;

a second connector connecting a second of said drive beams to the tubular extension of its drive unit;

a fixed tubular slide bearing for each tubular extension; and each said tubular extension extending through its tubular slide bearing, wherein in use the cylinder components and their tubular extensions reciprocate longitudinally relative to the fixed piston components and the tubular slide bearings.

19. The drive assembly of claim 18, which comprises three said piston-cylinder drive units, and a third connector connecting a third of said drive beams to both the cylinder component and the tubular extension of its drive unit.

20. A drive assembly according to claim 19, wherein each drive beam has a width that is less than the length of its corresponding cylinder component, and wherein the combined width of any two of said drive beams is larger than the length of either of their corresponding cylinder components, and wherein the combined length of any of the cylinder components and the corresponding tubular extension is larger than the combined widths of the three transverse drive beams.

21. A drive assembly according to claim 19, wherein the fixed piston components of the drive units are mounted on a first transverse mounting member, said tubular slide bearings are mounted on a second transverse mounting member, and wherein the drive beams are mounted between said first and second mounting members, such that the drive beams are essentially perpendicular to said drive units.

22. A reciprocating slat conveyor, comprising:

an elongated conveyor frame;

a plurality of longitudinally extending elongated load engaging conveyor slats mounted on the conveyor frame and arranged in a plurality of slat sets;

a conveyor slat drive comprising a pair of fixed longitudinally spaced apart transverse frame members connected to the conveyor frame;

a plurality of drive beams extending transversely of the conveyor slats, centrally of the transverse frame members, each said drive beam being associated with a different set of the conveyor slats;

a plurality of piston-cylinder drive units, one for each set of conveyor slats and associated drive beam, each said drive unit having a longitudinally fixed piston component fixed to a first of said transverse frame members, a movable cylinder component, and a tubular extension that is connected to the cylinder component and extends endwise from it in a direction opposite the piston component;

a first connector connecting one of said drive beams to the cylinder component of its drive unit;

a second connector connecting a second of said drive beams to the tubular extension of its drive unit;

a fixed tubular slide bearing for each tubular extension, said slide bearings being connected to the second of said transverse frame members;

each said tubular extension extending through its tubular slide bearing; and wherein in use the cylinder components, their tubular extensions, the drive beams and the conveyor slats reciprocate longitudinally relative to the transverse frame members, the fixed piston components and the fixed tubular slide bearings.

23. A reciprocating slat conveyor according to claim 22, said conveyor comprising three said piston-cylinder drive units, and a third connector connecting a third of said drive beams to both the cylinder component and the tubular extension of its drive unit.

24. A reciprocating slat conveyor according to claim 23, wherein each drive beam has a width that is less than the length of its corresponding cylinder component, and wherein the combined width of any two of said drive beams is larger than the length of either of their corresponding cylinder components, and wherein the combined length of any of the cylinder components and the corresponding tubular extension is larger than the combined widths of the three transverse drive beams.

25. A reciprocating slat conveyor according to claim 22, wherein each piston component comprises an elongated piston rod having an inner end and an outer end, a piston head at its inner end, and first and second fluid passageways extending through said piston rod, said first fluid passageway extending through said piston rod from the outer end to a first working chamber on one side of the piston head, and said second fluid passageway extending through said piston rod from the outer end to a second working chamber on the opposite side of the piston head.

26. A reciprocating slat conveyor according to claim 25, each said piston component having a ball member at the outer end of its piston rod, and said conveyor slat drive including a ball member receiving socket structure for each drive unit, each of said first and second fluid passageways in each piston rod including a portion that is in the ball member that is at the outer end of the piston rod, and each said socket structure including fluid passageways communicating with the fluid passageway portions in the ball members.

27. A reciprocating slat conveyor according to claim 26, wherein each cylinder component includes a cylinder head that includes a first wear ring that engages the corresponding piston rod, and each piston head includes a second wear ring that engages a sidewall portion of the corresponding cylinder component, wherein contact of the first wear ring with the piston rod and contact of the second wear ring with the sidewall portion of the cylinder component stiffens the drive unit, and wherein during use each drive unit functions as a structural beam that is supported at one end by the ball member, the socket structure, and the first transverse frame member, and at the opposite end by the tubular extension, the tubular slide bearing and the second transverse frame member.

28. A reciprocating slat conveyor according to claim 27, wherein the first transverse frame member includes a horizontal portion to which the socket structures are connected.

29. A reciprocating slat conveyor according to claim 27, wherein the socket structures each have a detachable portion that when detached permits removal of the ball member from the socket structure, and the connectors that connect the drive beams to the drive units are detachable connections.

30. A reciprocating slat conveyor according to claim 29, wherein the tubular slide bearings are detachably connected to the second transverse frame member.

31. A reciprocating slat conveyor according to claim 27, wherein the first transverse frame member includes a horizontal portion to which the socket structures are connected and an upstanding portion adapted to receive and mount longitudinal support beams for the conveyor slats.

32. A reciprocating slat conveyor according to claim 31, wherein the second transverse frame member includes an upstanding portion adapted to receive and mount longitudinal support beams for the conveyor slats.

* * * * *

UNITED STATES PATENT AND TRADEMARK OFFICE
CERTIFICATE OF CORRECTION

PATENT NO. : 5,605,221
DATED : February 25, 1997
INVENTOR(S) : Raymond Keith Foster It is certified that error appears in the above-identified patent and that said Letters Patent is hereby corrected as shown below:

Column 4, line 24, "bolts" should be -- bolts' --.
Column 13, line 31, "Mi" should be -- M1 --.
Column 19, line 1, "length-" should be -- length --.
Column 19, line 48, there is a period after "M'".
Column 22, lines 19-20, "On the return stroke," begins a new paragraph.

Signed and Sealed this

Third Day of February, 1998

Attest:

BRUCE LEHMAN

Attesting Officer    Commissioner of Patents and Trademarks